(12) United States Patent  (10) Patent No.: US 7,000,110 B1
Terao  (45) Date of Patent: Feb. 14, 2006

(54) ONE-WAY FUNCTION GENERATION METHOD, ONE-WAY FUNCTION VALUE GENERATION DEVICE, PROVING DEVICE, AUTHENTICATION METHOD, AND AUTHENTICATION DEVICE

(75) Inventor: Taro Terao, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 870 days.

(21) Appl. No.: 09/588,547

(22) Filed: Jun. 6, 2000

(30) Foreign Application Priority Data

Aug. 31, 1999 (JP) ................................ 11-244519

(51) Int. Cl.
*H04L 9/00* (2006.01)

(52) U.S. Cl. ..................... 713/172; 713/156; 380/28; 380/30; 380/286

(58) Field of Classification Search ................ 713/156, 713/172; 380/28, 30, 286
See application file for complete search history.

(56) References Cited

U.S. PATENT DOCUMENTS

| | | | | |
|---|---|---|---|---|
| 4,926,480 A | * | 5/1990 | Chaum | 705/69 |
| 4,947,430 A | * | 8/1990 | Chaum | 713/180 |
| 5,200,999 A | * | 4/1993 | Matyas et al. | 380/277 |
| 5,201,000 A | * | 4/1993 | Matyas et al. | 380/30 |
| 5,768,382 A | * | 6/1998 | Schneier et al. | 380/251 |
| 5,850,450 A | * | 12/1998 | Schweitzer et al. | 380/30 |
| 6,154,541 A | * | 11/2000 | Zhang | 380/28 |
| 6,240,513 B1 | * | 5/2001 | Friedman et al. | 713/152 |
| 6,389,536 B1 | | 5/2002 | Nakatsuyama | |
| 6,625,295 B1 | * | 9/2003 | Wolfgang et al. | 382/100 |

FOREIGN PATENT DOCUMENTS

| | | |
|---|---|---|
| JP | A-2-110491 | 4/1990 |
| JP | A-8-204702 | 8/1996 |
| JP | A-11-234262 | 8/1999 |

OTHER PUBLICATIONS

Stallings, William; Cryptography and Network Security; Jul. 4, 1998; Prentice-Hall, Inc.; 2nd Edition; pp. 163-206, 299-353.*

Schneier, Bruce; Applied Cryptography; 1996; John Wiley & Sons, Inc.; 2nd Edition; pp. 1-18, 233-301, 461-512.*

* cited by examiner

*Primary Examiner*—Gilberto Barron, Jr.
*Assistant Examiner*—Jung W. Kim
(74) *Attorney, Agent, or Firm*—Oliff & Berridge, PLC

(57) ABSTRACT

Without the need to store and manage a private unique value of a hash function for each token, and without the fear of organizational private information of a center being revealed, a hash function is provided to a token. A unique value input unit is supplied with a unique value d, which is a parameter required to generate a hash function X. A message input unit is supplied with a message M from which to find a hash value. A function generation unique value memory unit 3 holds a function generation unique value s, which is a parameter required to generate a value generation unique value. A value generation unique value calculation unit generates a value generation unique value u from the function generation unique value s and the unique value d. A hash value calculation unit generates a hash value X(M) by applying a hash function H to the value generation unique value u and the message M. A hash value output unit outputs the hash value X(M) generated by the hash value calculation unit.

38 Claims, 11 Drawing Sheets

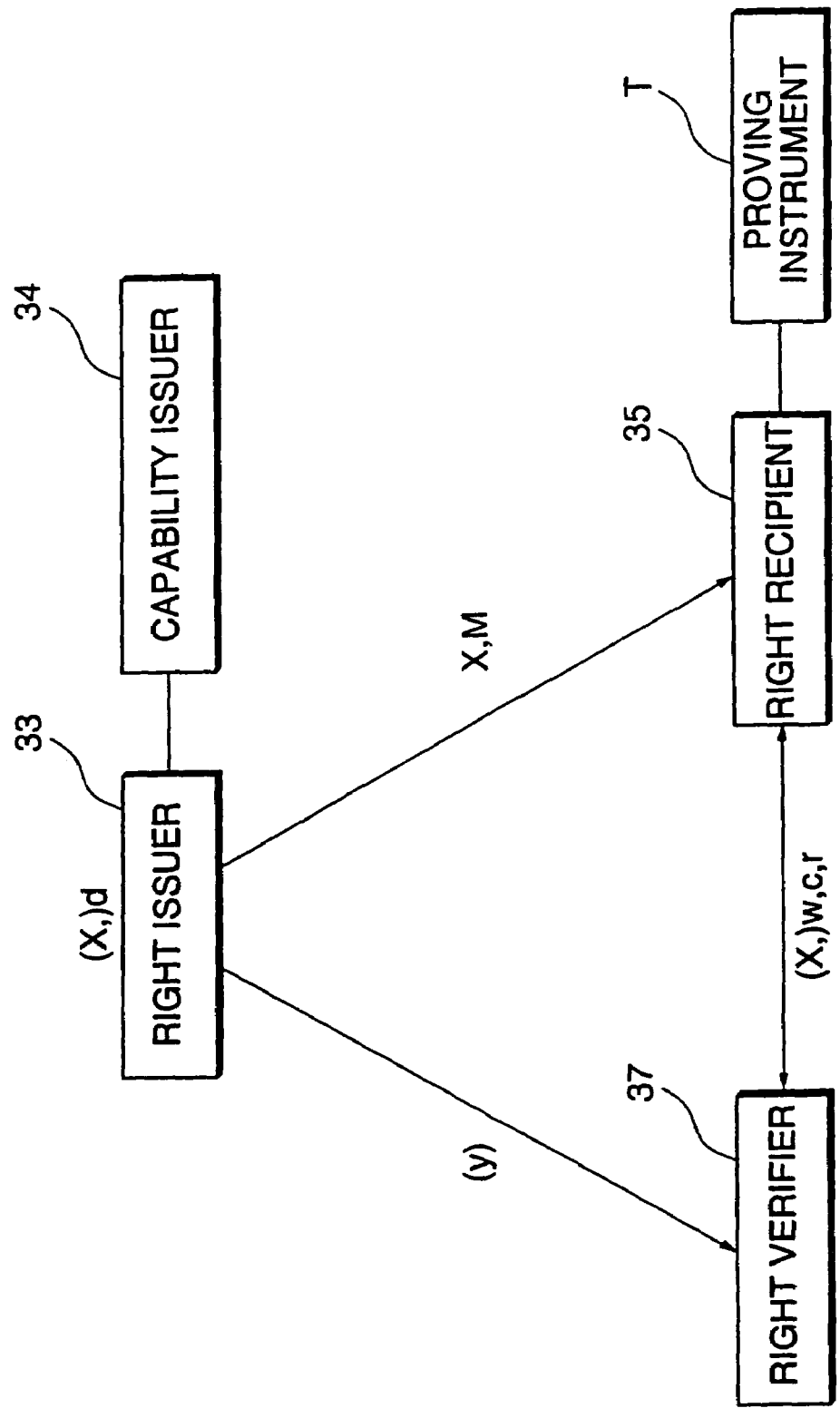

ONE-WAY FUNCTION GENERATION METHOD, ONE-WAY FUNCTION VALUE GENERATION DEVICE, PROVING DEVICE, AUTHENTICATION METHOD, AND AUTHENTICATION DEVICE

BACKGROUND OF THE INVENTION

1. Technical Field of the Invention

The present invention relates to information security technologies, and more particularly to a method for generating a one-way function, a device for generating one-way function values, and an authentication method and a device by use of them.

2. Description of the Prior Art

It is a common practice to enclose a private key for performing authentication in a tamper-resistant enclosure such as a smart card to distribute the key. The following authentication system can be configured which uses a private key enclosed in a tamper-resistant enclosure.

For simplicity of description, a distributor of private keys is referred to as a center, tamper-resistant enclosures to store the private keys as tokens, and recipients of the private keys as users.

The center generates a private key x, encloses it in a token, and distributes the token to users. The token is configured so that processing based on the private key x is executable. For example, the token may be configured as described below.

The center defines a public key cryptosystem. For example, let G be a finite Abelian group difficult with discrete logarithm problems (written in additive form for simplicity of notation. Of course, the following discussion can, simply by changing the notation, be applied to even groups conventionally written in multiplicative form); p, a prime number; $F_p$, the p-elements field; $g: F_p \to G$, a non-trivial homomorphism from the additive group of field $F_p$ to the finite group G; $y: F_p \to G$, the homomorphism defined by y=gx (x is identified to the endomorphism of the additive group of the field $F_p$ defined by multiplication); and $\pi: G \to F_p$, a mapping. It is well known that we can take the multiplicative group and elliptic curves on finite fields as such finite groups G The token, which has an input-output means, a random number generation means, means for calculating a mapping $\pi g$, and means for executing an algorithm with the finite prime field $F_p$, generates a random number k for an inputted challenge c and outputs response $r=(r_0, r_1)$ by calculating the following expression:

$$r_0 = c - \pi(g(k))$$

$$r_1 = k - r_0 x \quad \text{[Expression 1]}$$

On the other hand, a verifier, which has an input-output means, a random number generation means, means for calculating homomorphism g, means for calculating homomorphism y, means for executing an algorithm with the finite group G, and means for executing an algorithm with the finite prime field $F_p$, generates and outputs the challenge c as a random number, and verifies that the following expression is satisfied for the inputted response r:

$$c = r_0 + \pi(g(r_1) + y(r_0)) \quad \text{[Expression 2]}$$

By combining the verifier and the token, authentication can be performed as follows. For the challenge c sent by the verifier, the token sends back, as the response r, a Nyberg-Rueppel signature by the private key x for the challenge c. This technique is applicable to access control in a way that incorporates a verifier facility in an application program subject to access control, distributes a token as the rights to use the application program, and performs the above-described authentication in the challenge-and-response fashion as required during program execution. Authentication codes in the application program must be protected against analysis to prevent attackers from deleting them.

In direct application of the above-described technique, e.g., when plural independent application programs access-controlled by the same technique are used, although the number of necessary authentication types increases and as many tokens as the number of authentication types are required, the plural authentication types can be supported by only one token as described below.

In this example, the center encloses a private key x different for each token and distributes it to users. Each application program is allocated an authentication identifier aid. When an application program provider grants the rights to use an application program corresponding to an authentication identifier aid to the users, the provider issues a certificate C signed by the provider to the users wherein the certificate includes the authentication identifier aid and a public key y of a user-possessed token.

The application program, during execution of the program, at the timing of authenticating the user's rights, reads the certificate C and verifies the signature, confirms that the described authentication identifier aid is equal to the authentication identifier of the application program, and performs authentication based on the described public key y of the token as described previously.

The method of using a certificate including a public key corresponding to a private key stored in a token as the capability of access rights authentication is excellent in that, provided that the center to distribute private keys enclosed in tokens is a credible third party, plural application program providers having no interests among them can use the method in common and users have only to hold a single token. For example, if a system is configured which in advance incorporates token modules in the CPU, the center will be saved the trouble of distributing the tokens to the users and the users will also be able to use the system without being aware of the tokens.

On the other hand, such a method is undesirable from the viewpoint of users' privacy because public keys of tokens are used as the global identifiers of users, and when capabilities are collected in a large scale, capabilities can be sorted by users.

On the other hand, the following authentication system can be configured which solves the above- described problems by enclosing a private hash function in a tamper-resistant enclosure and distributing it.

In this case, the center generates a private hash function X, encloses it in a token, and distributes the token to a user. The private hash function X is different for each token.

When an application program provider grants a capability representing rights to a user in the form of the certificate C as described previously, for example, the provider includes a token public key y=g(X(aid)) corresponding to a hash value X(aid) generated by a private hash function X for an authentication identifier aid in the certificate C.

This time, since a corresponding public key y is different for each authentication identifier aid, even if capabilities are collected, they cannot be sorted by users.

To authenticate rights for use, a step is only added which inputs an authentication identifier aid for authentication to a token and generates a private key x=X(aid) corresponding to it; other processing is the same.

As an example that a different token has a different private hash function X, in an access rights authenticating device described in Japanese Published Unexamined Patent Application No. H10-247905, capabilities different than in the above description are proposed.

Herein, a pair of a public key y and a private key x to satisfy y=g(x) is defined to depend on only an authentication identifier aid independently of a private hash value X(aid) within a token possessed by each user (e.g., the authentication identifier aid may be a public key y itself), and a capability issued to the user is defined as t=x−X(aid). An amount thus calculated from the private key x and the private hash value X(aid) within a token, i.e., a capability, will be referred to as an access ticket.

The verifier holds a public key y corresponding to an identifier aid of its own and performs the above-described authentication in the challenge-and- response fashion.

The user inputs aid to a token, generates a private hash value X(aid) within the token, and obtains a response $r=(r_0, r_1)$ using the private key x for a challenge c.

The user further updates the token-outputted response r with an access ticket t using an expression:

$$r_1 \leftarrow r_1 + r_0 t \quad \text{[Expression 3]}$$

and then sends the response r back to the verifier.

It can be easily confirmed that the updated response r is a Nyberg-Rueppel signature by the private key x for the challenge c.

The access-ticket-based authentication method saves application programs from reading capabilities and verifying the authenticity of capabilities, further simplifying the construction of the verifier (access control codes of the application programs) and providing increased efficiency.

The access-ticket-based authentication method has noticeable characteristics that since processing based on private keys can be performed without disclosing the private keys themselves, which are independent of private hash values generated within tokens, in addition to authentication in the challenge-and-response fashion, processing based on the private keys (e.g., the decryption of cipher text in public key cryptograph and the creation of signature to messages) can be safely committed.

The above-described access control methods based on certificates and access tickets are applicable to not only the execution control of application programs but also, e.g., the control of access to files and the control of access to http servers.

By distributing tokens in the form of portable smart cards or the like and storing capabilities in the tokens, ordinary tickets and cards can be imitated with the digital information of the capabilities.

A variety of authentication methods can be used by enclosing not a private key but a private hash function in a token, as described above.

[Problems of Prior Art]

Hash functions are usually used as fixed functions released as primitives constituting a cryptographic protocol and there are many cases where only standard hash functions such as SHA-1 (Secure Hash Algorithm) and MD5 (Message Digest) are provided in IC chips for encryption. Therefore, in view of the cost of mounting tokens, it is necessary to examine a method for implementing a different private hash function for a different token by using the standard hash functions.

One simple method is to have tokens hold a standard hash function H and a private unique value u different for each token and implement a private hash function X as X(M)=H (u|M).

In this case, although the center may generate u as a random number for each token and hold a tupple (tid, u) of a token identifier and the token private unique value u in a database, if the number of tokens increases, the amount of data would become tremendous and the entries in the database must be kept secret to maintain the above-described authentication system, making the management difficult.

For example, where capabilities of certificate type are used, when a private hash function X of one token leaks, unless the issuer of the capabilities notices the leak, from this point on, each time a certificate C corresponding to the token and the authentication identifier aid is issued, persons knowing the certificate C and a private key x corresponding to it can pass verification without using the token. However, in this case, the leaker can be traced from the private hash value X(M).

Where capabilities of access ticket type are used, when a private hash function X of one token leaks, unless the issuer of the capabilities notices the leak, from this point on, each time an access ticket t corresponding to the token and the authentication identifier aid is issued, a private key x corresponding to the authentication identifier aid as x=t+X(M) is systematically revealed, posing a serious problem. Moreover, in this case, the leaker cannot be traced from the revealed private key x itself.

To reduce the amount of data to be secretly held by the center, a center private unique value s is introduced so that no private unique value is provided for each token. Herein, the private hash function X is implemented as X(M)=H (s|tid|M).

In such a configuration, if the center safely manages only the unique private information s, although it is unnecessary to hold private unique information for each token, global private information s will be enclosed in tokens. Should the assumption of tamper resistance be broken in one token, provided that the token identifier tid is accessible data, there is a danger that private hash functions of all tokens would be revealed in unison.

The authentication method having been heretofore described can be implemented on not only Nyberg-Rueppel signatures on the finite group G difficult with discrete logarithm problems cited as an example but also various public key cryptosystems.

The authentication method is applicable equally to public key cryptosystems based on the difficulty of discrete logarithm problems, such as Diffie-Hellman key sharing, DSA (Digital Signature Algorithm) signature, and Schnorr authentication.

The authentication method is also applicable to public key cryptosystems such as RSA and Guillou-Quisquater authentication based on the difficulty of annihilator decision problems.

In this case, assume that $\lambda$ is a minimum nonzero integer to annihilate all elements $\gamma$ ($\lambda\gamma=0$) of the finite Abelian group G and it is difficult to decide $\lambda$ for the finite group G. It is well known that such finite groups G include a multiplicative group $(Z/nZ)^*$ of a residue class ring of a rational integer ring Z modulo n where n is an RSA modulus.

For example, Guillou-Quisquater signatures on the finite group G may be adopted as a public key cryptosystem to use, as a capability, a certificate C to prove a public key y=pX (aid) with a private hash value X(aid) as a private key, and an access ticket t=x−X(aid) corresponding to a private key x and a public key y=px may be used as a capability.

RSA on the finite group G is selected as a public key cryptosystem to use an access ticket t=x−X(aid) corresponding to a public key y and a private key x=y$^{-1}$ as a capability.

In these examples, the private hash value X(aid) is regarded as an element of a finite algebraic system to which private values of a public key cryptosystem belong. The algebraic system to which the private values belong is the finite prime field $F_p$ in the example of discrete logarithm problem systems such as Nyberg-Rueppel signatures, and is the finite group G itself and its faithful action ring z/λZ, respectively, in the example of annihilator decision problem systems such as Guillou-Quisquater signatures and RSA.

In the example of discrete logarithm problem systems, presently, a recommended private key size (about 160 bits) is almost equal to the size of values of hash functions usually used, whereas in the example of annihilator decision problem systems, a recommended private key size (about 1024 bits) is greater than the size of values of hash functions usually used.

SUMMARY OF THE INVENTION

As has been described above, the present invention intends to propose a method for distributing private hash functions which provides lower center management costs, minimizes the disclosure of private information even if a token including a private hash function were unsealed, and brings down token development costs by using standard hash functions, wherein the private hash functions have values of the same size as the key size of private keys of public key cryptograph to be used.

To distribute such private hash functions, the present invention provides a hash function generation method that systematically generates a family of hash functions generated by transforming standard hash function by a given parameter, wherein the parameter itself used to generate the hash functions is not used in the computation of the hash functions generated by the method.

The hash function generation scheme of the present invention is that, to generate a hash function X dependent on an existing hash function H and a unique value d, a center holds a hash function generation unique value s, a hash value generation device including a hash value generation unique value u calculated from the hash function generation unique value s and the unique value d is distributed to a user, and a hash value X(M) of a message M is generated by applying the hash function H to the hash value generation unique value u and the message M.

In the present invention, since a hash value generation unique value u different for each token is generated from a hash function generation unique value of the center and a unique value of a token (user), it is unnecessary to hold and manage a private unique value for each token. The leak of the hash value generation unique value u held in a token would not systematically reveal private information (hash function generation unique value s of the center).

The present invention, as set forth in the claims, can be implemented as a one-way function generation method, a one-way function value generation device, a proving device, a proving instrument issuing device, an authentication method, an authentication device, and an access ticket issuing device. At least part of the present invention can be implemented as a software product.

BRIEF DESCRIPTION OF THE DRAWINGS

Preferred embodiments of the present invention will be described in detail based on the followings, wherein:

FIG. 20 is a block diagram showing a concept of an authentication system.

DESCRIPTION OF THE PREFERRED EMBODIMENTS

First of all, symbols used in common in the subsequent description will be explained.

Z is a rational integer ring, p is a prime number, $F_p$ is the p-elements field, and $\{0, 1\}^*$ is the monoid of bit strings (the law of composition is concatenation of bit strings, denoted by |)

G is a finite Abelian group, and $\pi: G \to F_p$, $\epsilon: G \to \{0, 1\}^*$, and $\eta: \{0, 1\}^* \to F_p$ are mappings.

For simplicity, the finite group G is written in additive form. When γ is an element of the finite group G and ν is a rational integer, ν times γ is always represented as ν·γ in the form of left action. When the finite group G is multiplicatively described, 0 may be replaced by 1; $\gamma+\gamma'$ by $\gamma\gamma'$; $-$by/; and $v\cdot\gamma$by $$\gamma^v \quad \text{[Expression 4]}$$

g is an element of the finite group G with order p, $\lambda$ is a generator of annihilators of the finite group G $$Ann\ G = \{v \in Z;\ (\forall \gamma \in G)\ v\cdot\gamma=0\} \quad \text{[Expression 5]}$$

$\Lambda$ is the residue class ring $Z/\lambda Z$ of a rational integer ring Z, modulo $\lambda$. The finite ring $\Lambda$ is a faithful action ring of the finite group G (if element $\alpha$ of $\Lambda$ times element $\gamma$ of G is well-defined, and if an element $\alpha$ of $\Lambda$ satisfies $\alpha\cdot\gamma=0$ for all element $\gamma$ of G, then $\alpha=0$)

Finding an element x of the p-elements field $F_p$ from a given element $y=x\cdot g$ of the finite group G will be referred to as a discrete logarithm problem with respect to base g, and finding a rational integer $\lambda$ will be referred to as an annihilators decision problem. The finite group G appearing in subsequent embodiments is difficult with either discrete logarithm problems or annihilators decision problems.

As the finite group G difficult with discrete logarithm problems, multiplicative groups $GL_1$ or an elliptic curves E on a finite field $F_q$ where q is a power of a prime number are well known. As the finite group G difficult with annihilators decision problems, a multiplicative group of a residue class ring of a rational integer ring Z modulo composite number n is well known.

Mapping $\pi:G \to F_p$ includes hash functions, reductions modulo p, and coordinate functions ($\pi(P)=x_p$ for $P=(x_p, y_p)$) where q<p and the finite group G is an elliptic curve on the finite field $F_q$.

Mapping $\epsilon:G \to \{0, 1\}^*$ includes functions and hash functions for achieving natural encoding (representation as bit strings) of elements of the finite group G.

Mapping $\eta: \{0, 1\}^* \to F_p$ includes hash functions.

First Embodiment: Hash Value Generation Device

Figure 1:
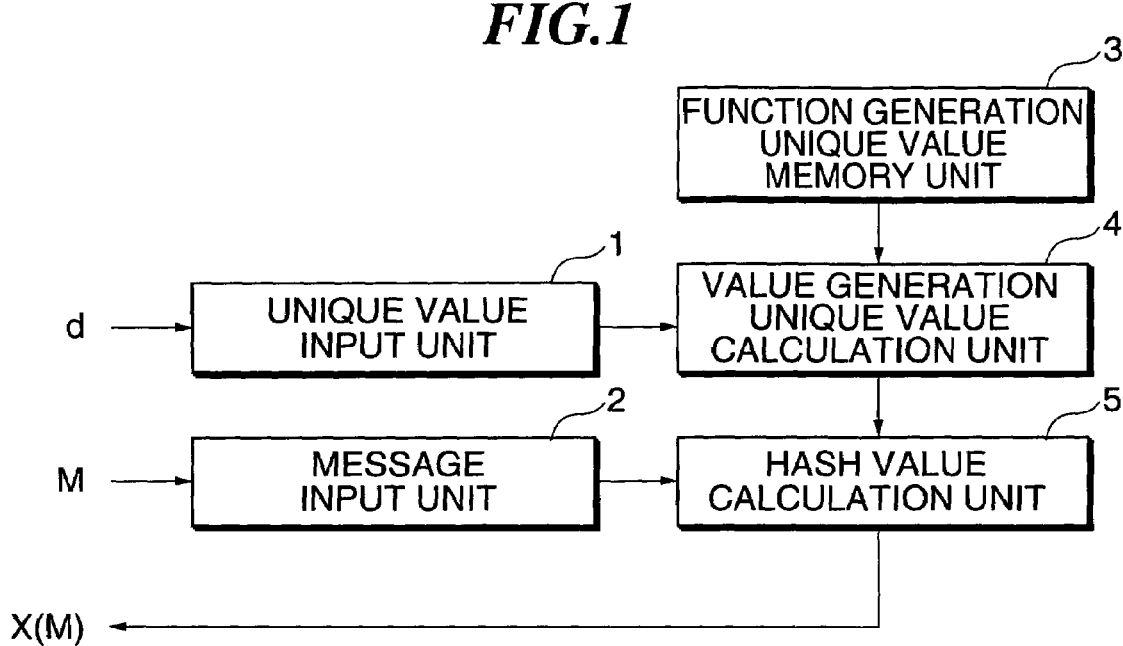
FIG. 1 is a block diagram showing a configuration of a hash value generation device.

In this embodiment, referring to FIG. 1, a description will be made of a hash value generation device that, when a unique value d and a message M are inputted, outputs a hash value X(M) of a message M by a hash function X dependent on the unique value. FIG. 1 is a block diagram of the hash value generation device.

A unique value input unit 1 is supplied with a unique value d, which is a parameter required to generate a hash function X. A message input unit 2 is supplied with a message M from which to find a hash value. A function generation unique value memory unit 3 holds a function generation unique value s, which is a parameter required to generate a value generation unique value. A value generation unique value calculation unit 4 generates a value generation unique value u from the function generation unique value s stored in the function generation unique value memory unit 3 and the unique value d inputted to the unique value input unit 1. A hash value circulation unit 5 generates a hash value X(M) by applying a hash function H to the value generation unique value u generated by the value generation unique value calculation unit 4 and the message M inputted to the message input unit 2. A hash value output unit outputs the hash value X(M) generated by the hash value calculation unit 5.

As the hash function H, for example, MD5 (hash value length of 128 bits) of RSA Data Security, Inc., or SHA-1 (hash value length of 160 bits) defined in FIPS180-1 of National Institute of Standards and Technology of the U.S. may be used.

Hereinafter, a detailed method for generating the value generation unique value u and the hash value X(M) will be described, including variations of it.

The value generation unique value calculation unit 4 may calculate the value generation unique value u as $u=G(s|d)$, for example, by using a hash function G. Also in this case, MD5 and SHA-1 can be used as the hash function G. The hash function G may be identical with the hash function H.

The value generation unique value u may be calculated as $u=E(d, s)$, for example, by using an encryption function E of symmetric key. Provided the unique value d is an encryption key, the size of the value generation unique value u is the same as the size of the function generation unique value s.

The hash value calculation unit 5 may calculate the hash value X(M), e.g., as $X(M)=H(u|M)$. If the hash value X(M) is thus calculated, the length of the hash value X(M) is the same as the hash value length of the hash function H.

A description will be made of a method for making the hash value X(M) longer than the hash value length of the hash function H.

The value generation unique value calculation unit 4 calculates value generation unique values $u=(u_1, \ldots, u_m)$ as $u_i=G(s_i|d)$ by using, e.g., the hash function G for the unique value d and function generation unique values $s=(s_1, \ldots, s_m)$. Alternatively, by using $d=(d_1, \ldots, d_m)$ for the unique value d, the value generation unique values $u=(u_1, \ldots, u_m)$ may also be calculated as $u_i=G(s_i|d_i)$.

The hash value calculation unit 5 calculates the hash value X(M) as $X(M)=H(u_1|M)| \ldots |H(u_m|M)$. Thereby, the length of the hash value X(M) is m times the hash value length of the hash function H; for example, provided MD5 having 128-bit hash values is used as the hash function H and m is set equal to 8, the length of the hash value X(M) is 1024 bits. Or, provided SHA-1 having 160-bit hash values is used as the hash function H and m is set equal to 7, if the high-order 1024 bits of $H(u_1|M)|\ldots|H(u_m|M)$ are used as the hash value X(M) 1024-bit hash values X(M) can be obtained.

For example, the hash value X(M) is calculated as $X(M)=E(H(u|M), u)$ by using the hash function H and the encryption function E of symmetric key for the value generation unique value u and the message M. Herein, if the first variable of E is an encryption key, the length of the hash value X(M) becomes equal to the length of the value generation unique value u. If the length of the value generation unique value u is long, long hash values are obtained in this way.

Second Embodiment: Proving Device (Fixed Two-way Authentication)

Figure 2:
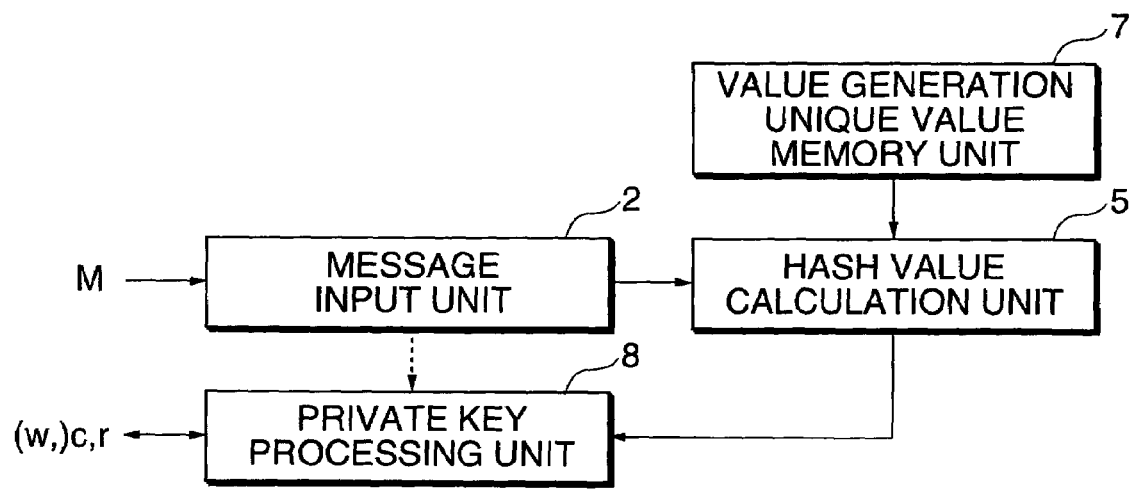
FIG. 2 is a block diagram showing a configuration of a proving device.
Figure 3:
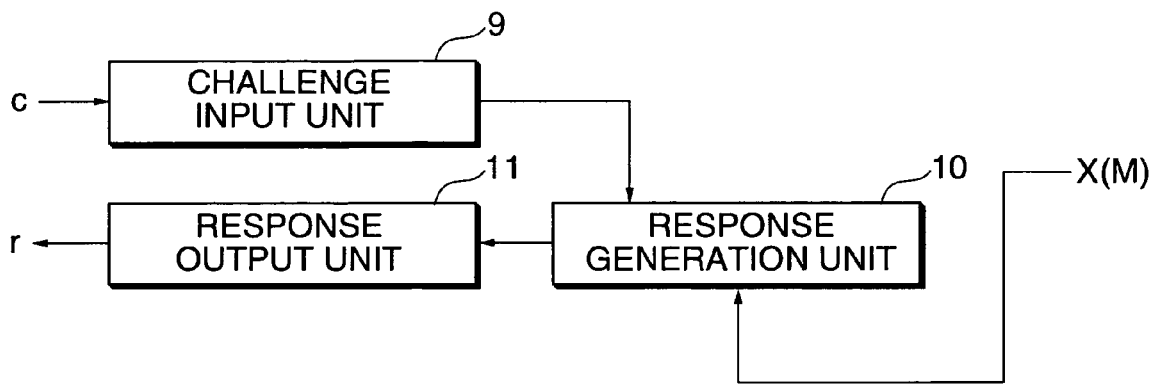
FIG. 3 is a block diagram showing a detailed configuration of a private key processing unit.

In this embodiment, referring to FIGS. 2 and 3, a description will be made of a proving device that, when a message M is inputted, performs processing based on a private key X(M) dependent on the message M. FIG. 2 is a block diagram of the proving device. The proving device of this embodiment has the same message input unit 2 and the hash value calculation unit 5 that are equivalent to those used in the hash value generation device (the first embodiment). FIG. 3 is a detailed block diagram of a private key processing unit 8.

A value generation unique value memory unit 7 holds a value generation unique value u, which is a parameter required to generate the hash value X(M). The hash value calculation unit 5 generates the hash value X(M) by applying the hash function H to the value generation unique value u held in the value generation unique value memory unit 7 and the message M inputted to the message input unit 2. The private key processing unit 8 processes the hash value X(M) generated by the hash value calculation unit 5 as a private key.

The proving device may be implemented as a portable device such as smart cards. Thereby, the users can carry the proving device with them at all times and use it at various aspects.

The proving device may be implemented as, e.g., an internal module of the CPU. If the proving device is primarily used for access rights authentication during use of a computer, the proving device incorporated in advance in the CPU need not be purchased aside from the computer and is advantageous to contents providers wishing to protect contents by access rights authentication by use of the proving device because they can be saved the trouble of distributing the proving device.

The message input unit 2 may perform processing based on the inputted message M.

For example, if the message M includes use conditions such as expiration date information and the use conditions are not satisfied, the input of the message may be rejected. This enables processing based on private keys to be performed in association with use conditions such as expiration date information.

The message M may include private key processing parameters G, p, $\pi$, $\epsilon$, $\eta$, and g. This enables private key processing parameters to be modified in association with the message M.

The message M may include identifiers of private key processing algorithms. This enables private key processing algorithms to be modified in association with the message M.

The private key processing unit 8, as shown in FIG. 3, has a challenge input unit 9, a response generation unit 10, and a response output unit 11.

The challenge input unit 9 is supplied with challenge c, which is query information for authentication. The response generation unit 10 generates response r from the challenge c inputted to the challenge input unit 9 and the hash value X(M) generated by the hash value calculation unit 5. The response output unit 11 outputs the response r generated by the response generation unit 10.

A method for generating response r will be described using Diffie-Hellman key sharing and RSA as examples.

It is assumed that the finite group G is difficult with discrete logarithm problems in the example of Diffie-Hellman key sharing, and is difficult with annihilators decision problems in the example of RSA. The hash value X(M) generated by the hash value calculation unit 5 is an element of p element field $F_p$ in the example of Diffie-Hellman key sharing, and an element of the finite ring $\Lambda$ in the example of RSA. The challenge c inputted to the challenge input unit 9 is an element of the finite group G.

[Diffie-Hellman Key Sharing]

Response r is generated as:

$r = X(M) \cdot c$  [Expression 6]

[RSA]

Response r is generated as:

$r = X(M) \cdot c$  [Expression 7]

Third Embodiment: Proving Device (Random Two-way Authentication)

Figure 4:
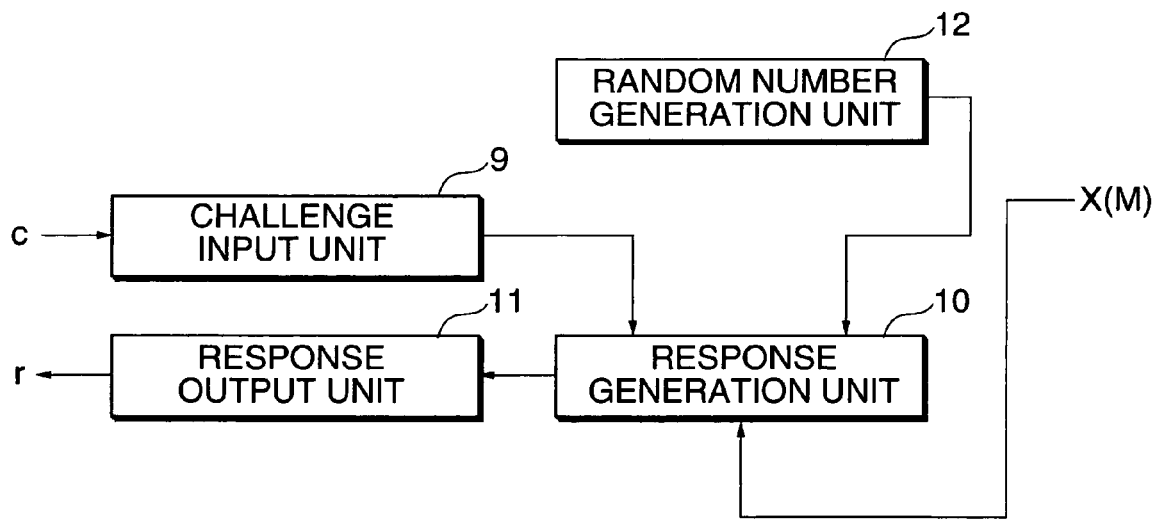
FIG. 4 is a block diagram showing a detailed configuration of a private key processing unit.

In this embodiment, referring to FIG. 4, a description will be made of an example of a proving device having the private key processing unit 8 different from that in the second embodiment. FIG. 4 is a detailed block diagram of the private key processing unit 8.

The private key processing unit 8 has a random number generation unit 12, the challenge input unit 9, the response generation unit 10, and the response output unit 11.

The random number generation unit 12 generates a random number k. The response generation unit 10 generates response r from the random number k generated by the random number generation unit 12, the challenge c inputted to the challenge input unit 9, and the hash value X(M) generated by the hash value calculation unit 5.

Hereinafter, a detailed method for generating response r will be described, including variations of it.

It is assumed that the finite group G is difficult with discrete logarithm problems in examples of DSA signature, variants of ElGamal signature, Nyberg-Rueppel signature, and Schnorr signature, and difficult with annihilators decision problems in examples of message recovery type Guillou-Quisquater signature, and Guillou-Quisquater signature.

The hash value X(M) generated by the hash value calculation unit 5 and the random number k generated by the random number generation unit 12 are elements of the p-elements field $F_p$ in examples of DSA signature, variants of ElGamal signature, Nyberg-Rueppel signature, and Schnorr signature, and are elements of the finite group G in examples of message recovery type Guillou-Quisquater signature, and Guillou-Quisquater signature.

The challenge c inputted to the challenge input unit 9 is an element of the p-elements field $F_p$ in examples of DSA signature, variants of ElGamal signature, Nyberg-Rueppel signature, and message recovery type Guillou-Quisquater signature, and are any bit string in examples of Schnorr signature and Guillou-Quisquater signature.

[DSA Signature]

Response r is generated as:

$r = (r_0, r_1)$ $r_0 = \pi(k \cdot g)$ $r_1 = (c + r_0 X(M))/k$  [Expression 8]

[Transformed ElGamal Signature 1]

Response r is generated as:

$r = (r_0, r_1)$ $r_0 = \pi(k \cdot g)$ $r_1 = ck - r_0 X(M)$  [Expression 9]

[Transformed ElGamal Signature 2]

Response r is generated as:

$r = (r_0, r_1)$ $r_0 = \pi(k \cdot g)$ $r_1 = r_0 k - cX(M)$  [Expression 10]

[Transformed ElGamal Signature 3]
Response r is generated as:

$r=(r_0, r_1)$ $r_0=\pi(k \cdot g)$ $r_1=(r_0+cX(M))/k$ [Expression 11]

[Transformed ElGamal Signature 4]
Response r is generated as:

$r=(r_0, r_1)$ $r_0=\pi(k \cdot g)$ $r_1=(ck-r_0)/X(M)$ [Expression 12]

[Transformed ElGamal Signature 5]
Response r is generated as:

$r=(r_0, r_1)$ $r_0=\pi(k \cdot g)$ $r_1=(r_0k-c)/X(M)$ [Expression 13]

[Nyberg-Rueppel Signature]
Response r is generated as:

$r=(r_0, r_1)$ $r_0=c-\pi(k \cdot g)$ $r_1=k-r_0X(M)$ [Expression 14]

[Schnorr Signature]
Response r is generated as:

$r=(r_0, r_1)$ $r_0=\eta(c|\epsilon(k \cdot g)$ $r_1=k+r_0X(M)$ [Expression 15]

[Message Recovery Type Guillou-Quisquater Signature]
Response r is generated as:

$r=(r_0, r_1)$ $r_0=c-\pi(p \cdot k)$ $r_1=k-r_0 \cdot X(M)$ [Expression 16]

[Guillou-Quisquater Signature]
Response r is generated as:

$r=(r_0, r_1)$ $r_0=\eta(c|\epsilon(p \cdot k)$ $r_1=k+r_0 \cdot X(M)$ [Expression 17]

Fourth Embodiment: Proving Device (Three-way Authentication)

Figure 5:
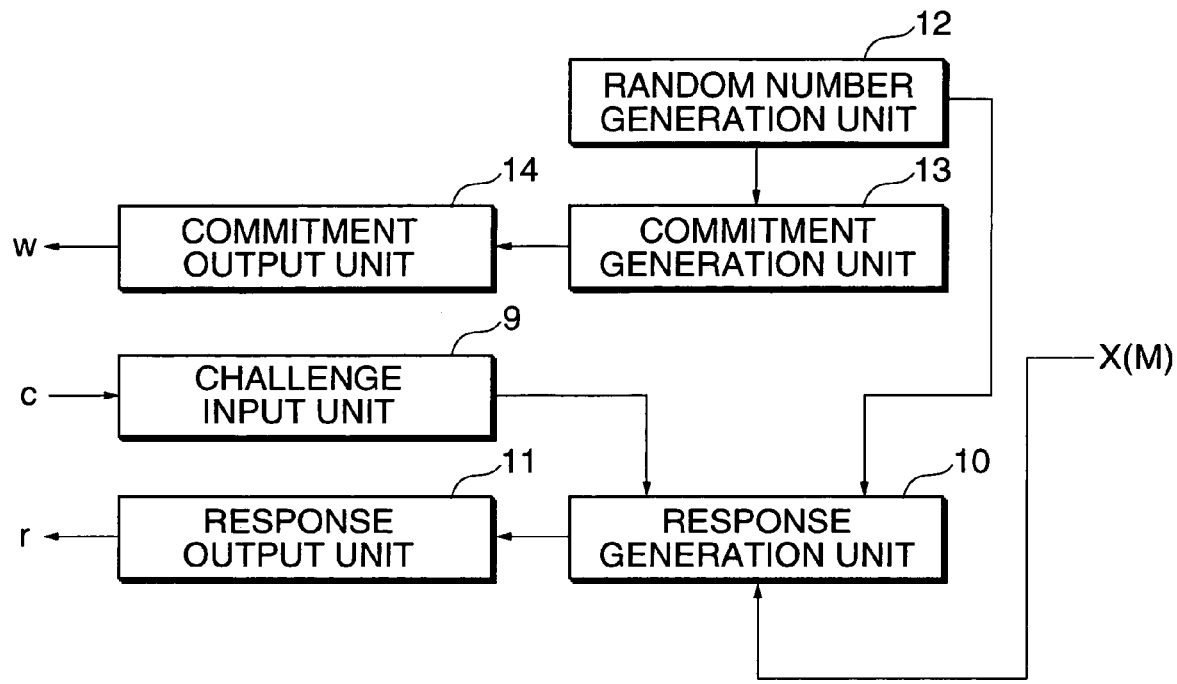
FIG. 5 is a block diagram showing a detailed configuration of a private key processing unit.

In this embodiment, referring to FIG. 5, a description will be made of an example of a proving device having the private key processing unit 8 different from that in the second or third embodiment. FIG. 5 is a detailed block diagram of the private key processing unit 8.

The private key processing unit 8 has the random number generation unit 12, a commitment generation unit 13, a commitment output unit 13, the challenge input unit 9, and the response generation unit 10, and the response output unit 11.

The random number generation unit 12 generates the random number k. The commitment generation unit 13 generates a commitment w from the random number k generated by the random number generation unit 12. The commitment output unit 14 outputs the commitment w generated by the commitment generation unit 13. The response generation unit 10 generates the response r from the random number k generated by the random number generation unit 12, the challenge c inputted to the challenge input unit 9, and the hash value X(M) generated by the hash value calculation unit 5.

It is to be noted that the random number k generated by the random number generation unit 12 should be discarded immediately after being used to generate the response r in the response generation unit 10 so that identical random number k is not duplicately used to generate a different response r.

Hereinafter, a detailed method for generating response r will be described using Schnorr authentication, Guillou-Quisquater authentication, and Fiat-Shamir authentication as examples.

It is assumed that the finite group G is difficult with discrete logarithm problems in an example of Schnorr signature, and difficult with annihilators decision problems in examples of Guillou-Quisquater authentication and Fiat-Shamir authentication.

The hash value X(M) generated by the hash value calculation unit 5 and the random number k generated by the random number generation unit 12 are elements of the p-elements field $F_p$ in an example of Schnorr authentication, and are elements of the finite group G in examples of Guillou-Quisquater authentication and Fiat-Shamir authentication.

The challenge c inputted to the challenge input unit 9 is an element of the p element field $F_p$ in examples of Schnorr authentication and Guillou-Quisquater authentication, and is a fixed-length bit string in an example of Fiat-Shamir authentication.

[Schnorr Authentication 1]
Commitment w is generated as:

$w=\pi(k \cdot g)$ [Expression 18]

and response r is generated as:

$r=k-cX(M)$ [Expression 19]

[Schnorr Authentication 2]
Commitment w is generated as:

$w=k \cdot g$ [Expression 20]

and response r is generated as:

$r=k-cX(M)$ [Expression 21]

[Guillou-Quisquater Authentication 1]
Commitment w is generated as:

$w=\pi(p \cdot k)$ [Expression 22]

and response r is generated as:

$r=k-c \cdot X(M)$ [Expression 23]

13

[Guillou-Quisquater authentication 2]
Commitment w is generated as:

$$w = p \cdot k \quad \text{[Expression 24]}$$

and response r is generated as:

$$r = k - c \cdot X(M) \quad \text{[Expression 25]}$$

[Fiat-Shamir Authentication 1]
Commitment w is generated as:

$$w = \pi(2 \cdot k) \quad \text{[Expression 26]}$$

and response r is generated as:

$$r = k - \Sigma c_i \cdot X(M) \quad \text{[Expression 27]}$$

where $$c = (c_1, \ldots, c_n)$$

$$X(M) = (X(M)_1, \ldots, X(M)^n) \quad \text{[Expression 28]}$$

[Fiat-Shamir Authentication 2]
Commitment w is generated as:

$$w = 2 \cdot k \quad \text{[Expression 29]}$$

and response r is generated as:

$$r = k - \Sigma c_i \cdot X(M)_i \quad \text{[Expression 30]}$$

where $$c = (c_1, \ldots, c_n)$$

$$X(M) = (X(M)_1, \ldots, X(M)_n) \quad \text{[Expression 31]}$$

Fifth Embodiment: Proving Device (Pseudo-three-way authentication)

Figure 6:
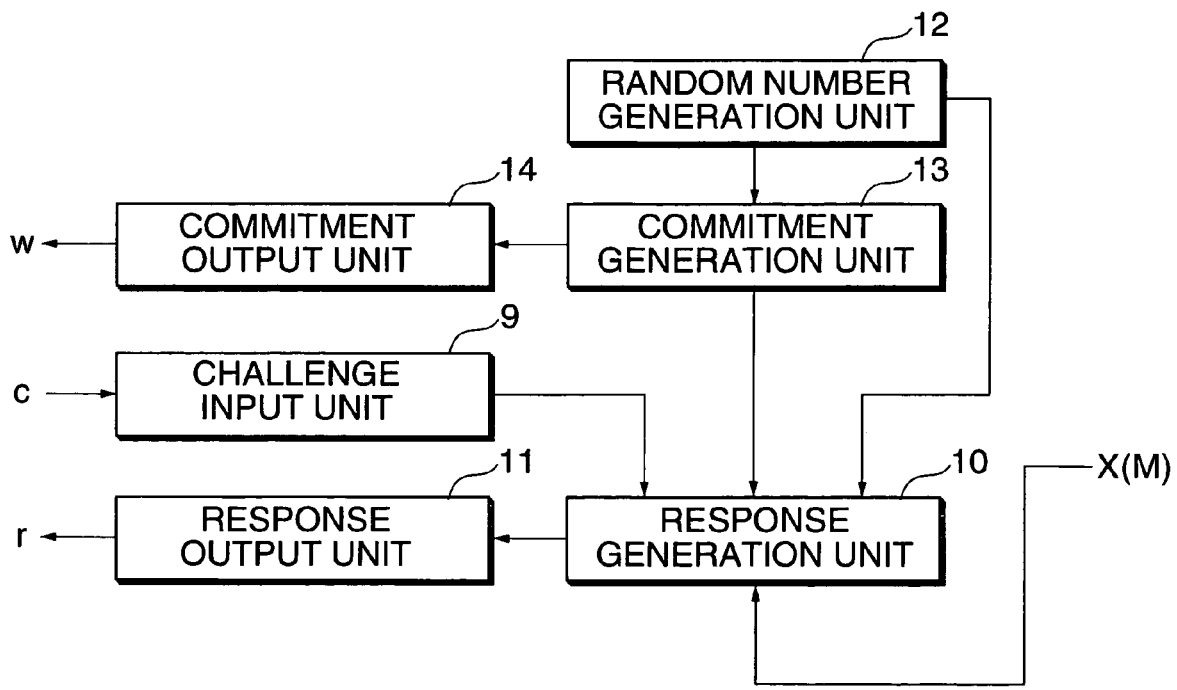
FIG. 6 is a block diagram showing a detailed configuration of a private key processing unit.

In this embodiment, referring to FIG. 6, a description will be made of an example of a proving device having the private key processing unit 8 different from that in the second or fourth embodiment. FIG. 6 is a detailed block diagram of the private key processing unit 8.

The private key processing unit 8 has the same configuration as that in the proving device of the fourth embodiment.

The response generation unit 10 generates the response r from the random number k generated by the random number generation unit 12, the commitment generated by the commitment w generation unit 13, the challenge c inputted to the challenge input unit 9, and the hash value X(M) generated by the hash value calculation unit 5.

Hereinafter, a detailed method for generating response r will be described using DSA authentication as an example.

It is assumed that the finite group G is difficult with discrete logarithm problems. The hash value X(M) generated by the hash value calculation unit 5, the random number k generated by the random number generation unit 12, and the challenge c inputted to the challenge input unit 9 are elements of the p element field $F_p$.

[DSA Authentication]
Commitment w is generated as:

$$w = \pi(k \cdot g) \quad \text{[Expression 32]}$$

and response r is generated as:

$$r = (c - w X(M))/k \quad \text{[Expression 33]}$$

14

By the way, if response r is replaced by a pair (w, r) of commitment w and response r as follows:

$$r \leftarrow (w, r) \quad \text{[Expression 34]}$$

the response r is nothing but a DSA signature for the challenge c.

Sixth Embodiment: Proving Instrument Issuing Device

Figure 7:
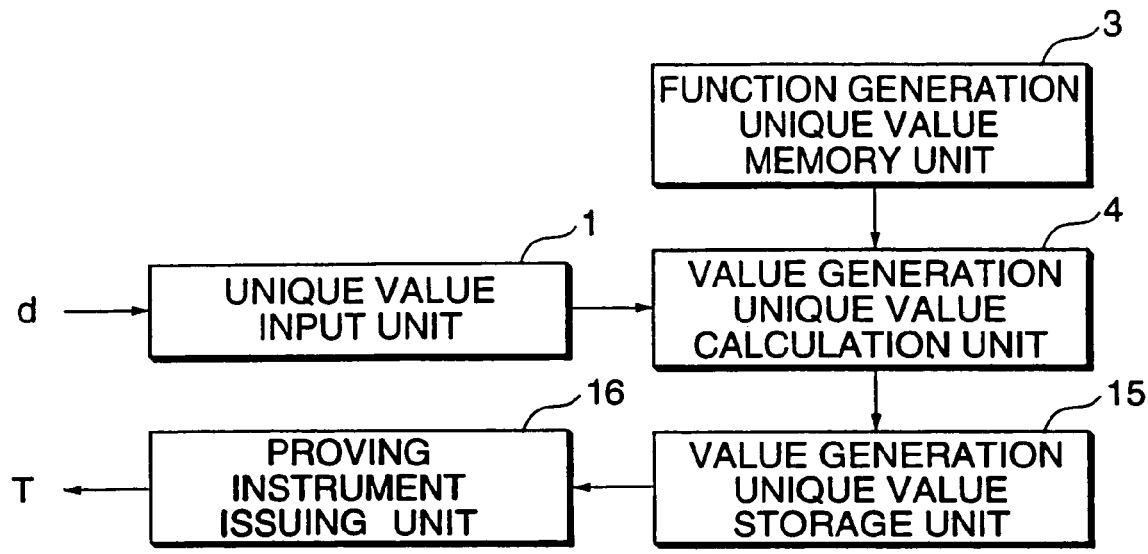
FIG. 7 is a block diagram showing a configuration of a proving instrument issuing device.

In this embodiment, referring to FIG. 7, a description will be made of a device that, when a unique value d is inputted, issues a proving instrument (the second or fifth embodiment) having a hash function X dependent on the unique value d. FIG. 7 is a block diagram of the proving instrument issuing device. The proving instrument issuing device of this embodiment has the unique value input unit 1, the function generation unique value memory unit 3, and the value generation unique value calculation unit 4 that are equivalent to those used in the hash value generation device (the first embodiment).

The unique value input unit 1 is supplied with a unique value d, which is a parameter required to generate a hash function X. The function generation unique value memory unit 3 holds a function generation unique value s, which is a parameter required to generate a value generation unique value. The value generation unique value calculation unit 4 generates a value generation unique value u from the function generation unique value s stored in the function generation unique value memory unit 3 and the unique value d inputted to the unique value input unit 1. A value generation unique value storage unit 15 writes the value generation unique value u generated by the value generation unique value calculation unit 4 to a proving instrument T. A proving instrument issuing unit 16 issues a proving instrument T to which the value generation unique value storage unit 15 writes the value generation unique value u.

Seventh Embodiment: Certificate Type Authentication Device

Figure 8:
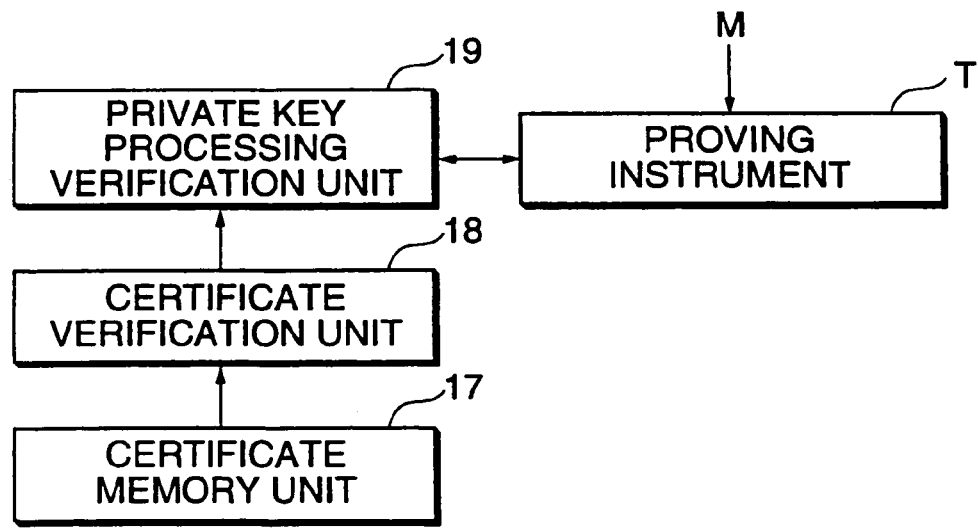
FIG. 8 is a block diagram showing a configuration of a certificate type authentication device.
Figure 9:
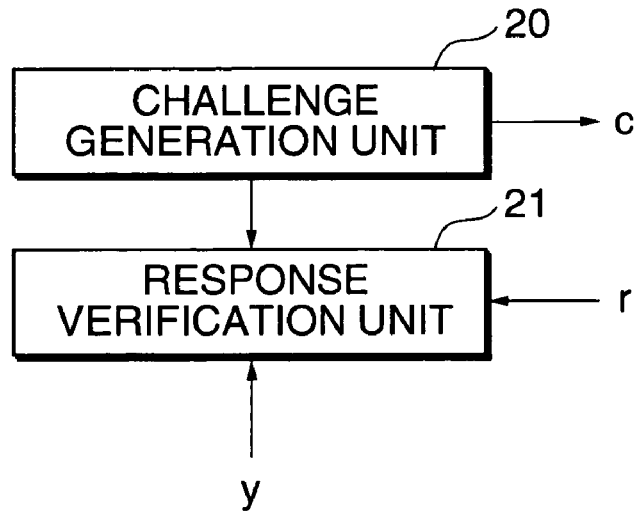
FIG. 9 is a block diagram showing a detailed configuration of a private key processing verification unit.

In this embodiment, referring to FIGS. 8 and 9, a description will be made of an authentication device using the proving instrument (the second and third embodiments). FIG. 8 is a block diagram of a certificate type authentication device and FIG. 9 is a detailed block diagram of a private key processing verification unit.

A certificate memory unit 17 holds a certificate C to prove a public key y paired with the hash value X(M), regarded as a private key, of a message M by a hash function X specific to the proving instrument. A certificate verification unit 18 verifies the certificate C held in the certificate memory unit 17, and if the verification is successful, obtains the public key y proved by the certificate C. A private key processing verification unit 19 verifies the private key processing of the proving instrument by carrying on a dialog with the proving instrument, based on the public key y obtained by the certificate verification unit 18.

The authentication device may, for example, be implemented as a program built into ROM within a smart card reader.

The authentication device may, for example, be implemented as codes embedded so that they are difficult to detect, in application programs to be subjected to access control. The application programs verify users' rights by performing authentication based on the codes as required during program execution.

The authentication device may be implemented as codes embedded so that they are difficult to detect, in, e.g., application programs to render digital contents to be subjected to access control. When the protected contents are to be rendered, the application programs verify users' rights by performing authentication based on the codes as required during program execution.

The certificate verification unit 18 may perform processing based on the held certificate C. For example, the certificate C may include use conditions such as expiration date information so that the certificate is unsuccessfully verified if the use conditions are not satisfied. By this arrangement, the certificate can be associated with use conditions such as expiration date information.

For example, the certificate C may include an authentication identifier so that the certificate is unsuccessfully verified if the identifier is different from an expected one. By this arrangement, the certificate C can accommodate to plural authentications without changing the signature key of a certificate issuer to warrant the correctness of the certificate.

The private key processing verification unit 19 has a challenge generation unit 20 and a response verification unit 21.

The challenge generation unit 20 generates challenge c, which is query information for authentication. The response verification unit 21 uses the public key y obtained from the certificate verification unit 18 and the challenge c generated by the challenge generation unit 20 to verify response r obtained from the response output unit 11 of the proving instrument.

The challenge generation unit 20 may generate the challenge c: at random; as c=H(M) as the hash value of a message M from which to generate a signature by using a hash function H; as c=K by selecting cipher text K to be decoded; and by generating random number k and affording a blind effect, by the random number k, to the cipher text K to be decoded.

Hereinafter, a method for verifying response r will be described, including its variations.

The public key y obtained by the certificate verification unit 18 is an element of the finite group G in examples of DSA signature, a variant of ElGamal signature, Nyberg-Rueppel signature, Schnorr signature, message recovery type Guillou-Quisquater signature, and Guillou-Quisquater signature, and is an element of the finite ring Λ in an example of RSA (for RSA, the public key y is substantially regarded as an integer).

[DSA Signature]
A verification expression for response r=($r_0$, $r_1$)

$$r_0 = \pi((c/r_1) \cdot g + (r_0/r_1) \cdot y) \quad \text{[Expression 35]}$$

[Variant ElGamal Signature 1]
A verification expression for response r=($r_0$, $r_1$) is:

$$r_0 = \pi((r_1/c) \cdot g + (r_0/c) \cdot y) \quad \text{[Expression 36]}$$

[Variant ElGamal Signature 2]
A verification expression for response r=($r_0$, $r_1$) is:

$$r_0 = \pi((r_1/r_0) \cdot g + (c/r_0) \cdot y) \quad \text{[Expression 37]}$$

[Variant ElGamal Signature 3]
A verification expression for response r=($r_0$, $r_1$) is:

$$r_0 = \pi((r_0/r_1) \cdot g + (c/r_1) \cdot y) \quad \text{[Expression 38]}$$

[Variant ElGamal Signature 4]
A verification expression for response r=($r_0$, $r_1$) is:

$$r_0 = \pi((r_0/c) \cdot g + (r_1/c) \cdot y) \quad \text{[Expression 39]}$$

[Variant ElGamal Signature 5]
A verification expression for response r=($r_0$, $r_1$) is:

$$r_0 = \pi((c/r_0) \cdot g + (r_1/r_0) \cdot y) \quad \text{[Expression 40]}$$

[Nyberg-Rueppel Signature]
A verification expression for response r=($r_0$, $r_1$) is:

$$c = r_0 + \pi(r_1 \cdot g + r_0 \cdot y) \quad \text{[Expression 41]}$$

[Schnorr Signature]
A verification expression for response r=($r_0$, $r_1$) is:

$$r_0 = h(c | \epsilon(r_1 \cdot g + r_0 \cdot y)) \quad \text{[Expression 42]}$$

[RSA]
A verification expression for response r is:

$$c = y \cdot r \quad \text{[Expression 43]}$$

[Message Recovery Type Guillou-Quisquater Signature]
A verification expression for response r=($r_0$, $r_1$) is:

$$c = r_{0+\pi}(p \cdot r_1 + y \cdot r_0) \quad \text{[Expression 44]}$$

[Guillou-Quisquater Signature]
A verification expression for response r=($r_0$, $r_1$) is:

$$r_0 = h(c | \epsilon(p \cdot r_1 + y \cdot r_0)) \quad \text{[Expression 45]}$$

Eighth Embodiment: Certificate Type Authentication Device (Two-way Authentication Diffie-Hellman Key Shared)

Figure 10:
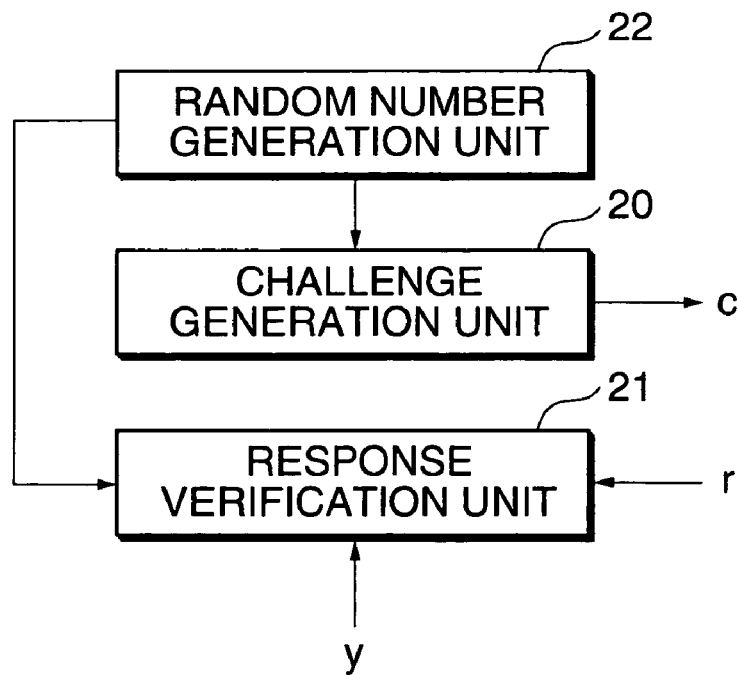
FIG. 10 is a block diagram showing a detailed configuration of a private key processing verification unit.

In this embodiment, referring to FIG. 10, a description will be made of an authentication device having the private key processing verification unit 19 different from that in seventh embodiment. FIG. 10 is a detailed block diagram of the private key processing verification unit 19.

The private key processing verification unit 19 has a random number generation unit 22, the challenge generation unit 20, and the response verification unit 21.

The random number generation unit 22 generates random number k. The challenge generation unit 20 generates challenge c, which is query information for authentication from the random number k generated by the random number generation unit 22. The response verification unit 21 uses the public key y obtained from the certificate verification unit 18 and the random number k generated by the random number generation unit 22 to verify response r obtained from the response output unit 11 of the proving instrument.

Hereinafter, a method for generating the challenge c and a verification expression for the response r will be described using Diffie-Hellman key sharing as an example.

The public key y obtained by the certificate verification unit 18 and the random number k generated by the random number generation unit 22 are elements of the finite group G.

[Diffie-Hellman Key Sharing]
The challenge c is generated as:

$$c = k \cdot g \quad \text{[Expression 46]}$$

A verification expression for the response r is:

$$k \cdot y = r \quad \text{[Expression 47]}$$

Ninth Embodiment: Certificate Type Authentication Device (Three-way Authentication)

Figure 11:
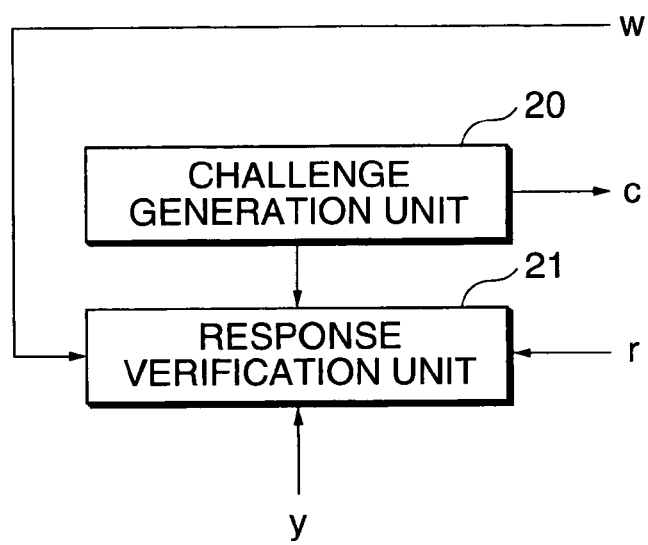
FIG. 11 is a block diagram showing a detailed configuration of a private key processing verification unit.

In this embodiment, referring to FIGS. 8 and 11, a description will be made of an authentication device using the proving instrument (the fourth embodiment). FIG. 8 is a block diagram of the certificate type authentication device, and FIG. 11 is a detailed block diagram of the private key processing verification unit.

The private key processing verification unit 19 has the challenge generation unit 20 and the response verification unit 21 like the seventh embodiment.

The challenge generation unit 20 randomly generates challenge c, which is query information for authentication. The response verification unit 21 uses the public key y obtained from the certificate verification unit 18, the commitment w obtained from the commitment output unit 11 of the proving instrument before generating the challenge c, and the challenge c generated by the challenge generation unit 20 to verify the response r obtained from the response output unit 11 of the proving instrument.

Hereinafter, a method for verifying response r will be described using Schnorr authentication and Guillou-Quisquater authentication as examples.

Public key y obtained from the certificate verification unit 18 is an element of the finite group G.

[Schnorr Authentication]
A verification expression for response r is:

$$W=\pi(r \cdot g + c \cdot y)) \qquad \text{[Expression 48]}$$

[Guillou-Quisquater Authentication]
A verification expression for response r is:

$$W=\pi(p \cdot r + c \cdot y)) \qquad \text{[Expression 49]}$$

[Fiat-Shamir Authentication]
A verification expression for response r is:

$$W=\pi(p \cdot r + \Sigma c_i \cdot y_i) \qquad \text{[Expression 50]}$$

Tenth Embodiment: Certificate Issuing Device

Figure 12:
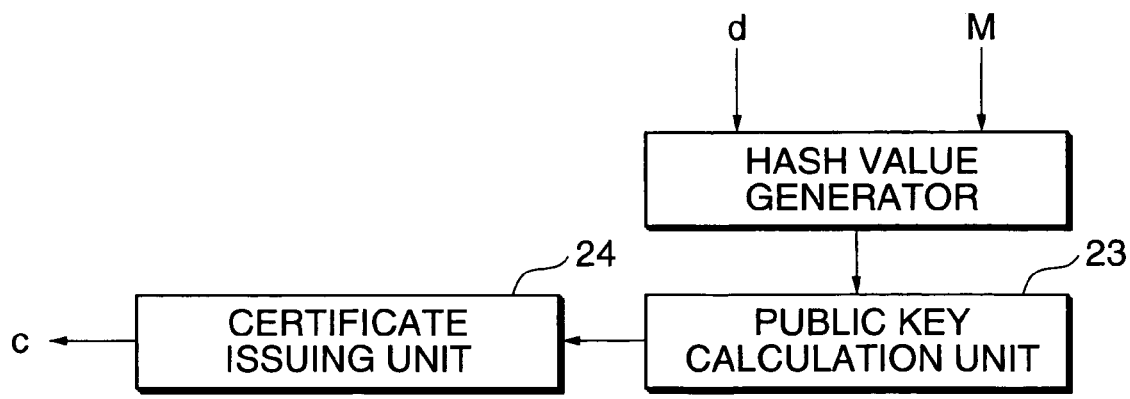
FIG. 12 is a block diagram showing a configuration of a certificate issuing device.

In this embodiment, referring to FIG. 12, a description will be made of a device that, when a unique value d and a message M are inputted, issues a certificate C used in the certificate type authentication device (the seventh or ninth embodiment) using the proving instrument (the second or sixth embodiment) issued in association with the unique value d by using the hash value generator (the first embodiment). FIG. 12 is a block diagram of the certificate issuing device.

A public key calculation unit 23 regards a hash value X(M) generated by the hash value generator as a private key and calculates a public key y paired with it. A certificate issuing unit 24 issues a certificate C that proves the public key y calculated by the public key calculation unit 23.

The certificate issuing unit 24 may be constructed to include an authentication identifier aid in the message M. This ensures that hash values X(M) corresponding to different authentication identifiers are different.

Hereinafter, a detailed method for calculating the public key y will be described.

[Finite Group G Difficult with Discrete Logarithm Problems]
Public key y is calculated as:

$$y=X(M) \cdot g \qquad \text{[Expression 51]}$$

[Finite Group G Difficult with Annihilator Area Decision Problems-1]
In Guillou-Quisquater authentication, Guillou-Quisquater signature, and message recovery type Guillou-Quisquater signature, public key y is calculated as:

$$y=p \cdot X(M) \qquad \text{[Expression 52]}$$

In Fiat-Shamir authentication, public key y is generated as:

$$y_i=2 \cdot X(M)_i \qquad \text{[Expression 53]}$$

where $$y=(y_1, \ldots, y_n)$$

$$X(M)=(X(M)_1, \ldots, X(M)_n) \qquad \text{[Expression 54]}$$

[Finite group G Difficult with Annihilators Decision Problems-2]
In RSA, public key y is calculated as:

$$y=X(M)^{-1} \qquad \text{[Expression 55]}$$

Eleventh Embodiment: Ticket Type Authentication Device (Conversion of Challenge)

Figure 13:
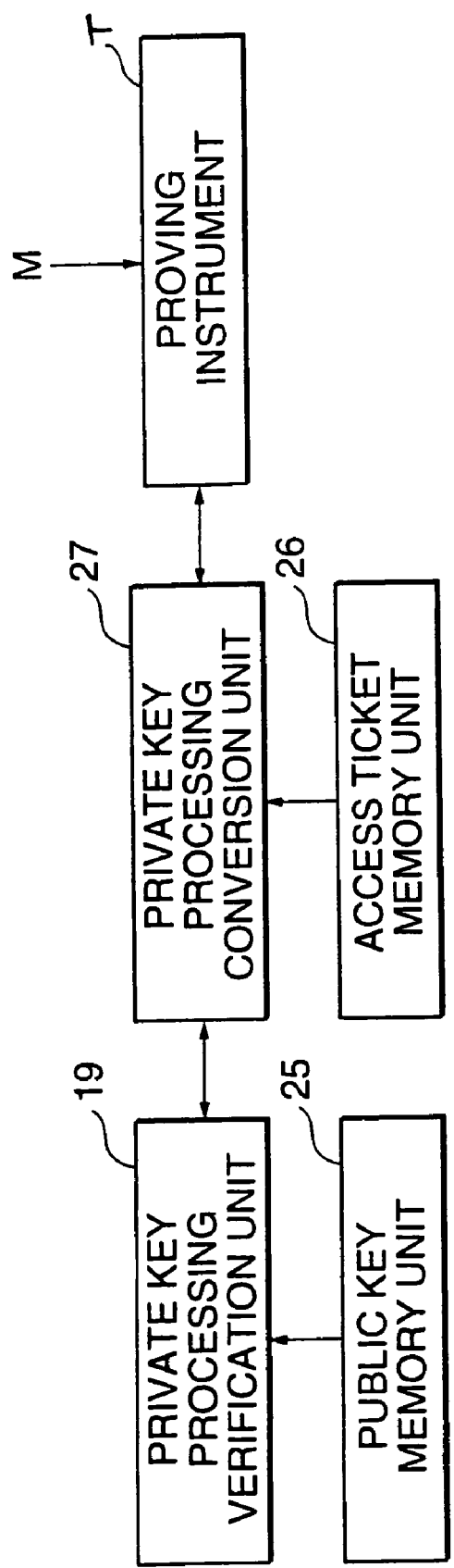
FIG. 13 is a block diagram showing a configuration of an access ticket authentication device.
Figure 14:
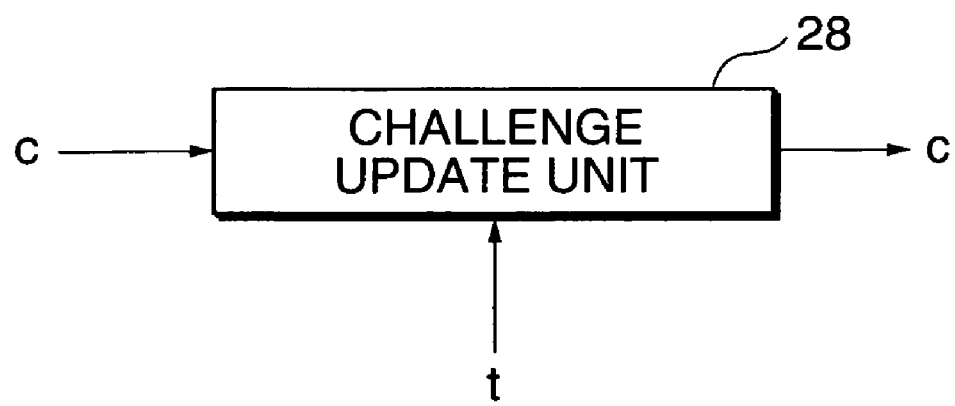
FIG. 14 is a block diagram showing a detailed configuration of a private key processing conversion unit.

In this embodiment, referring to FIGS. 13 and 14, a description will be made of an authentication device using the proving instrument (the second and third embodiments). FIG. 13 is a block diagram of an access ticket type authentication device. The authentication device of this embodiment has the private key processing verification unit 19 that is equivalent to that of the certificate type authentication device (the seventh or ninth embodiment). FIG. 14 is a detailed block diagram of a private key processing conversion unit 27.

A public key memory unit 25 holds public key y. An access ticket memory unit 26 holds a private key paired with the public key and an access ticket t determined from a hash value X(M). The private key processing verification unit 19 verifies the private key processing of the proving instrument by making a dialogue with the proving instrument based on the public key y which the public key memory unit 25 holds; at this time, the private key processing conversion unit 27 converts the private key processing of the proving instrument by using the access ticket t which the access ticket memory unit 26 holds.

The authentication device may, for example, be implemented as a program built into ROM within a smart card reader.

The authentication device may, for example, be implemented as codes embedded so that they are difficult to detect, in application programs to be subjected to access control. The application programs verify users' rights by performing authentication based on the codes as required during program execution.

The private key processing verification unit 19 has at least the challenge generation unit 20, and the private key processing unit 8 has at least the challenge input unit 9.

The private key processing conversion unit 27 has a challenge update unit 28.

The challenge update unit 28 updates the challenge c generated by the challenge generation unit 20 with the access ticket t which the access ticket memory unit 26 holds, and inputs the updated challenge c to the challenge input unit 9.

Hereinafter, a method for defining the access ticket t and a method for updating the challenge c will be described using Diffie-Hellman key sharing, ElGamal signature 3, Schnorr authentication, and RSA as examples.

A private key x is an element of the p-elements field $F_p$ in examples of Diffie-Hellman key sharing, variant ElGamal signature, and Schnorr authentication, and an element of the finite ring $\Lambda$ in an example of RSA (for RSA, the corresponding access ticket t is substantially regarded as an integer).

[Diffie-Hellman Key Sharing]
A definition expression for the access ticket t is:

$$t=x/X(M) \quad \text{[Expression 56]}$$

and the challenge c is converted as:

$$c \leftarrow t \cdot c \quad \text{[Expression 57]}$$

[Variant ElGamal Signature 3]
A definition expression for the access ticket t is:

$$t=x/X(M) \quad \text{[Expression 58]}$$

and the challenge c is converted as:

$$c \leftarrow ct \quad \text{[Expression 59]}$$

[Schnorr Authentication]
A definition expression for the access ticket t is:

$$t=x/X(M) \quad \text{[Expression 60]}$$

and the challenge c is converted as:

$$c \leftarrow ct \quad \text{[Expression 61]}$$

[RSA]
A definition expression for the access ticket t is:

$$t=x/X(M) \quad \text{[Expression 62]}$$

and the challenge c is converted as:

$$c \leftarrow t \cdot c \quad \text{[Expression 63]}$$

Twelfth Embodiment: Ticket Type Authentication Device (Conversion of Response)

Figure 15:
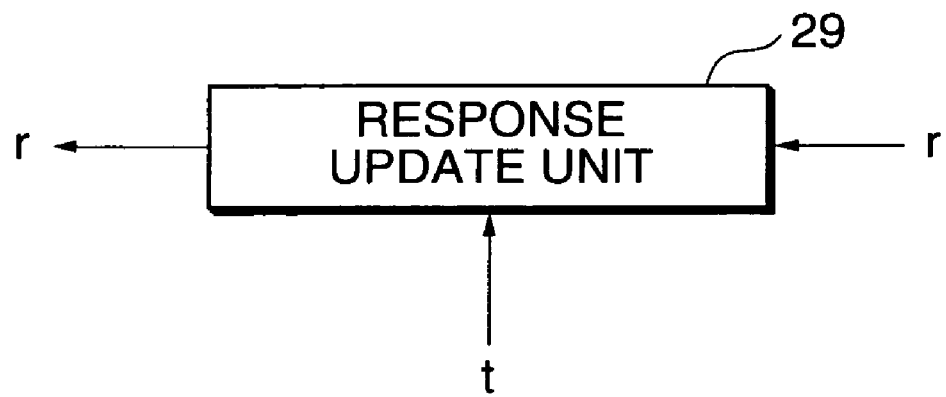
FIG. 15 is a block diagram showing a detailed configuration of the private key processing conversion unit.

In this embodiment, referring to FIG. 15, a description will be made of an example of an authentication device having the private key processing conversion unit 27 different from that of the eleventh embodiment. FIG. 15 is a detailed block diagram of the private key processing conversion unit 27.

The private key processing unit 8 has at least the response output unit 11.

The private key processing conversion unit 27 has a response update unit 29.

The response update unit 29 updates the response r outputted by the response output unit 11 with the access ticket t which the access ticket memory unit 26 holds.

Hereinafter, a method for defining the access ticket t and a detailed method for updating the response r will be described using Diffie-Hellman key sharing, variant ElGamal signature 1, variant ElGamal signature 4, variant ElGamal signature 5, RSA, Nyberg-Rueppel signature, and message recovery type Guillou-Quisquater signature as examples.

The private key x is an element of the p-elements field $F_p$ in examples of Diffie-Hellman key sharing, variant ElGamal signature 1, variant ElGamal signature 4, and variant ElGamal signature 5, and an element of the finite ring $\Lambda$ in an example of RSA (for RSA, the corresponding access ticket t is substantially regarded as an integer).

[Diffie-Hellman Key Sharing]
A definition expression for the access ticket t is:

$$t=x/X(M) \quad \text{[Expression 64]}$$

and the response r is converted as:

$$r \leftarrow t \cdot r \quad \text{[Expression 65]}$$

[Variant ElGamal Signature 1]
A definition expression for the access ticket t is:

$$t=x-X(M) \quad \text{[Expression 66]}$$

and the response $r=(r_0, r_1)$ is converted as:

$$r_1 \leftarrow r_1 - r_0 t \quad \text{[Expression 67]}$$

[Variant ElGamal Signature 4]
A definition expression for the access ticket t is:

$$t=x/X(M) \quad \text{[Expression 68]}$$

and the response $r=(r_0, r_1)$ is converted as:

$$r_1 \leftarrow r_1/t \quad \text{[Expression 69]}$$

[Variant ElGamal Signature 5]
A definition expression for the access ticket t is:

$$t=x/X(M) \quad \text{[Expression 70]}$$

and the response $r=(r_0, r_1)$ is converted as:

$$r_1 \leftarrow r_1/t \quad \text{[Expression 71]}$$

[RSA]
A definition expression for the access ticket t is:

$$t=x/X(M) \quad \text{[Expression 72]}$$

and the challenge c is converted as:

$$r \leftarrow t \cdot r \quad \text{[Expression 73]}$$

[Nyberg-Rueppel]
A definition expression for the access ticket t is:

$$t=x-X(M) \quad \text{[Expression 74]}$$

and response $r=(r_0, r_1)$ is converted as:

$$r_1 \leftarrow r_1 - r_0 t \quad \text{[Expression 75]}$$

[Message Recovery Type Guillou-Quisquater Signature]
A definition expression for the access ticket t is:

$$t=x-X(M) \quad \text{[Expression 76]}$$

and response $r=(r_0, r_1)$ is converted as:

$$r_1 \leftarrow r_1 - r_0 \cdot t \quad \text{[Expression 77]}$$

Thirteenth Embodiment: Ticket Type Authentication Device (Conversion of Response by Challenge)

Figure 16:
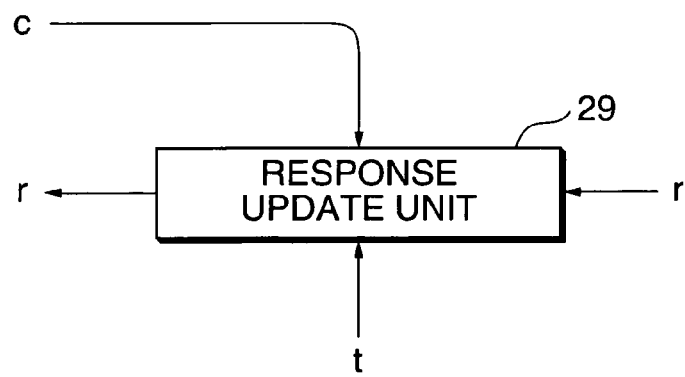
FIG. 16 is a block diagram showing a detailed configuration of the private key processing conversion unit.

In this embodiment, referring to FIG. 16, a description will be made of an example of an authentication device having the private key processing conversion unit 27 different from that of the eleventh or twelfth embodiment. FIG. 16 is a detailed block diagram of the private key processing conversion unit 27.

The private key processing verification unit 19 has at least the challenge generation unit 20, and the private key processing unit 8 has at least the response output unit 11.

The private key processing conversion unit 27 has the response update unit 29.

The response update unit 29 updates the response r outputted by the response output unit 11 with the access ticket t held by the access ticket memory unit 26 and the challenge c generated by the challenge generation unit 20.

Hereinafter, a method of defining the access ticket t and a method of updating the response r will be described using Diffie-Hellman key sharing, RSA, variant ElGamal signature 2, Schnorr authentication, and Guillou-Quisquater authentication as examples.

The private key x is an element of the p-elements field $F_p$ in examples of Diffie-Hellman key sharing, variant ElGamal signature 1, variant ElGamal signature 4, and variant ElGamal signature 5, and an element of the finite ring $\Lambda$ in an example of RSA (for RSA, the corresponding access ticket t is substantially regarded as an integer).

[Diffie-Hellman Key Sharing]

A definition expression for the access ticket t is:

$$t = x - X(M) \qquad \text{[Expression 78]}$$

and the response r is converted as:

$$r \leftarrow r + t \cdot c \qquad \text{[Expression 79]}$$

[RSA]

A definition expression for the access ticket t is:

$$t = x - X(M) \qquad \text{[Expression 80]}$$

and the response r is converted as:

$$r \leftarrow r + t \cdot c \qquad \text{[Expression 81]}$$

[Schnorr Authentication]

A definition expression for the access ticket t is:

$$t = x - X(M) \qquad \text{[Expression 82]}$$

and the response r is converted as:

$$r \leftarrow r + c \cdot t \qquad \text{[Expression 83]}$$

[Guillou-Quisquater Authentication]

A definition expression for the access ticket t is:

$$t = x - X(M) \qquad \text{[Expression 84]}$$

and the response r is converted as:

$$r \leftarrow r + c \cdot t \qquad \text{[Expression 85]}$$

Fourteenth Embodiment: Ticket Type Authentication Device (Conversion of Response by Updated Challenge)

Figure 17:
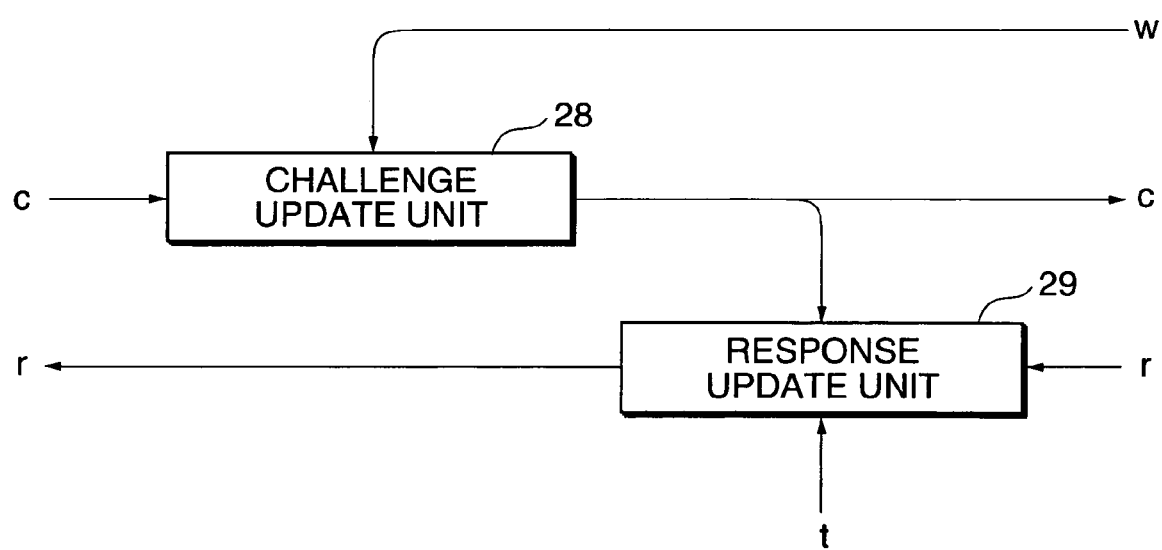
FIG. 17 is a block diagram showing a detailed configuration of the private key processing conversion unit.

In this embodiment, referring to FIG. 17, a description will be made of an example of an authentication device having the private key processing conversion unit 27 different from that of the eleventh or thirteenth embodiment. FIG. 17 is a detailed block diagram of the private key processing conversion unit 27.

The private key processing verification unit 19 has at least the challenge generation unit 20, and the private key processing unit 8 has at least the commitment output unit 11, the challenge input unit 9, and the response output unit 11.

The private key processing conversion unit 27 has the challenge update unit 28 and the response update unit 29.

The challenge update unit 28 updates the challenge c generated by the challenge generation unit 20 with the commitment w obtained from the commitment output unit 14 and inputs the updated challenge c to the challenge input unit 9.

The response update unit 29 updates the response r outputted by the response output unit 11 with the access ticket t held by the access ticket memory unit 26 and the challenge c updated by the challenge update unit 28.

Hereinafter, a method of defining the access ticket t and a method of updating the challenge c and the response r will be described using Schnorr authentication and Guillou-Quisquater authentication as examples.

The private key x is an element of the p-elements field $F_p$ in an example of Schnorr authentication, and an element of the finite group G in an example of Guillou-Quisquater.

[Conversion from Schnorr Authentication 1 to Nyberg-Rueppel Signature]

A definition expression for the access ticket t is:

$$t = x - X(M) \qquad \text{[Expression 86]}$$

and the challenge c is converted as:

$$c \leftarrow c - w \qquad \text{[Expression 87]}$$

and the response r is converted as:

$$r \leftarrow r + ct \qquad \text{[Expression 88]}$$

[Conversion from Schnorr Authentication 2 to Schnorr Signature]

A definition expression for the access ticket t is:

$$t = x - X(M) \qquad \text{[Expression 89]}$$

and the challenge c is converted as:

$$c \leftarrow \eta(c|\epsilon(w)) \qquad \text{[Expression 90]}$$

and the response r is converted as:

$$r \leftarrow r + ct \qquad \text{[Expression 91]}$$

[Conversion from Guillou-Quisquater Authentication to Message Recovery Type Guillou-Quisquater Signature]

A definition expression for the access ticket t is:

$$t = x - X(M) \qquad \text{[Expression 92]}$$

and the challenge c is converted as:

$$c \leftarrow c - w \qquad \text{[Expression 93]}$$

and the response r is converted as:

$$r \leftarrow r + ct \qquad \text{[Expression 94]}$$

[Conversion from Guillou-Quisquater Authentication 2 to Guillou-Quisquater Signature]

A definition expression for the access ticket t is:

$$t = x - X(M) \qquad \text{[Expression 95]}$$

and the challenge c is converted as:

$$c \leftarrow \eta(c|\epsilon(w)) \qquad \text{[Expression 96]}$$

and the response r is converted as:

$$r \leftarrow r + ct \qquad \text{[Expression 97]}$$

Fifteenth Embodiment: Ticket Type Authentication Device (Conversion of Challenge by Commitment)

Figure 18:
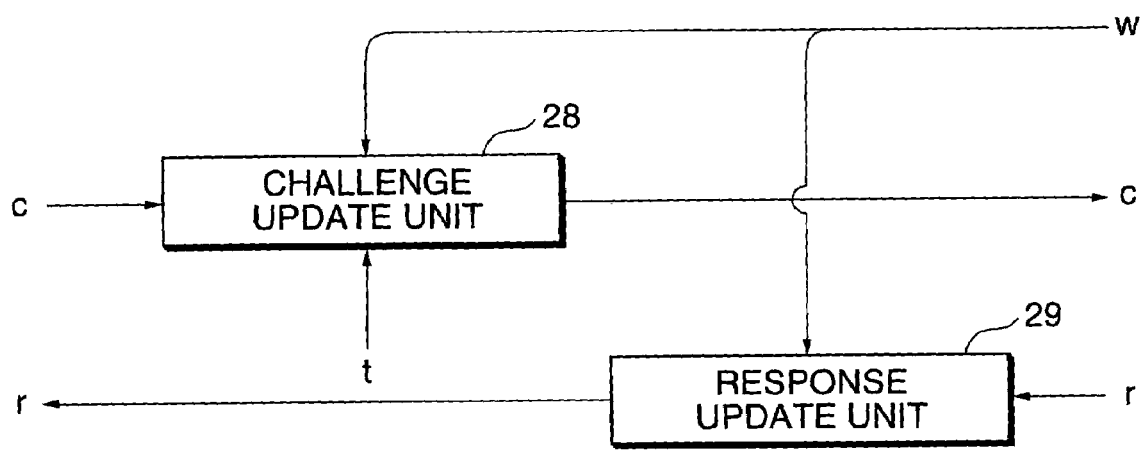
FIG. 18 is a block diagram showing a detailed configuration of the private key processing conversion unit.

In this embodiment, referring to FIG. 18, a description will be made of an example of an authentication device having the private key processing conversion unit 27 different from that of the eleventh or fourteenth embodiment. FIG. 18 is a detailed block diagram of the private key processing conversion unit 27.

The private key processing verification unit 19 has at least the challenge generation unit 20, and the private key processing unit 8 has at least the commitment output unit 11, the challenge input unit 9, and the response output unit 11.

The private key processing conversion unit 27 has the challenge update unit 28 and the response update unit 29.

The challenge update unit 28 updates the challenge c generated by the challenge generation unit 20 with the access ticket t held by the access ticket memory unit 26 and the commitment w obtained from the commitment output unit 14 and inputs the updated challenge c to the challenge input unit 9.

The response update unit 29 updates the response r outputted by the response output unit 11 with the commitment w obtained from the commitment output unit 14.

Hereinafter, a method of defining the access ticket t and a method of updating the challenge c and the response r will be described using DSA authentication as an example.

The private key x is an element of the p-elements field $F_p$.

[Conversion from DSA Authentication to DSA Signature]

A definition expression for the access ticket t is:

$$t = x - X(M) \quad \text{[Expression 98]}$$

the challenge c is converted as:

$$c \leftarrow c + wt \quad \text{[Expression 99]}$$

and the response r is converted as:

$$r \leftarrow (w, r) \quad \text{[Expression 100]}$$

Sixteenth Embodiment: Ticket Issuing Device

Figure 19:
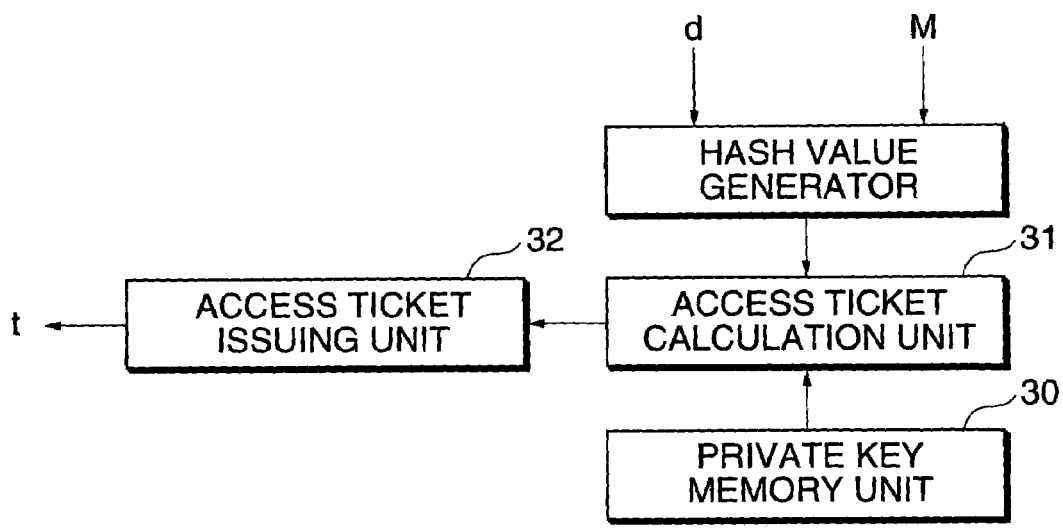
FIG. 19 is a block diagram showing a configuration of an access ticket issuing device.

In this embodiment, referring to FIG. 19, a description will be made of a device that, when a unique value d and a message M are inputted, issues the access ticket t used in the access ticket type authentication device (the eleventh or fifteenth embodiment) using the proving instrument (the second or sixth embodiment) issued in association with the unique value d by using the hash value generator (the first embodiment). FIG. 19 is a block diagram of the access ticket issuing device.

The access ticket calculation unit 31 calculates the access ticket t from the hash value X(M) generated by the hash value generator and the private key x held in the private key memory unit 30. The access ticket issuing unit 32 issues the access ticket t calculated by the access ticket calculation unit 31.

An authentication identifier aid may be included in the message M. This ensures that hash values X(M) corresponding to different authentication identifiers are different.

Hereinafter, a detailed method for calculating the access ticket t will be described.

[Private Key is an Element of the p Element Field $F_p$]

The access ticket t is calculated as:

$$t = x - X(M) \text{ or}$$

$$t = x / X(M) \quad \text{[Expression 101]}$$

[Private Key is an Element of the Finite Group G]

The access ticket is calculated as:

$$t = x - X(M) \quad \text{[Expression 102]}$$

[Private Key is an Element of the Finite Ring A]

The access ticket t is calculated as:

$$t = x - X(M) \text{ or}$$

$$t = x / X(M) \quad \text{[Expression 103]}$$

Seventeenth Embodiment: Authentication System

In this embodiment, referring to FIG. 20, a description will be made of an authentication system using the certificate type authentication device (the seventh or ninth embodiment) or the access ticket type authentication device (the eleventh or fifteenth embodiment). FIG. 20 is a block diagram showing a concept of the authentication system.

A right issuer (center) 33 holds a capability issuer (the tenth or sixteenth embodiment) 34 and a unique value d associated with a right recipient.

The right recipient (user) 35 holds the proving instrument (the second or fifth embodiment) T having the private hash function H issued in association with the unique value d by the proving instrument issuing device (the sixth embodiment).

When the right issuer 33 provides rights to the right recipient 35, it issues a capability $\chi$ representing the holding of rights in association with a message M to the right recipient 35 by using the capability issuing device.

The right recipient 35 proves to a right verifier 37 that rights have been provided, by using the capability $\chi$ and the authentication device including the proving device.

In a certificate type authentication system, authentication capabilities are provided to users as certificates that include a public key corresponding to a private hash value within a token and an authentication identifier and are signed by a person credible to the right verifier. Using the certificate issuing device (the tenth embodiment), an issuer of a certificate can issue the certificate to a user holding a token corresponding to the unique value d, in association with a message M. A token identifier tid, for example, can be selected as the unique value, and an authentication identifier aid, for example, can be selected as the message M.

In an access ticket authentication system, authentication capabilities are provided to users as access tickets, which are amounts calculated from a private hash value within a token and a private key corresponding to an authentication identifier. Using the access ticket issuing device (the sixteenth embodiment), an issuer of an access ticket can issue the access ticket to a user holding a token corresponding to the unique value d, in association with a message M. A token identifier tid, for example, can be selected as the unique value, and an authentication identifier aid, for example, can be selected as the message M.

As has been described, the one-way function generation technology of the present invention and the authentication method based on it enable users to use a variety of capabilities on a simple principle by providing single tokens.

What is claimed is:

1. A method for generating a one-way function dependent on a one-way function H and a unique value d for a user, comprising:

holding in memory a function generation unique value s by a right issuer for the user;

creating a value generation unique value u in a unique value calculation unit from the function generation unique value s provided from the memory and the unique value d, the value generation unique value u being provided as a series of m values where $u=(u_1, \ldots u_m)$ to a token for the user;

creating by a hash value calculation unit a one-way function value X(M) of a message M by applying the one-way function H to the value generation unique value u from the unique value calculation unit and the message M, where the one-way function value $X(M)=H(u_1|M)|\ldots|H(u_m|M)$;

holding a certificate C to prove a public key y paired with the one-way function value X(M);

issuing a capability $\chi$ from the right issuer to the user, the capability $\chi$ representing a right of the user in association with the message M; and verifying the user from the public key y and the capability $\chi$ by a right verifier.

2. The method for generating a one-way function according to claim 1, wherein the value generation unique value u is calculated by applying a one-way function G to the function generation unique value s and the unique value d.

3. The method for generating a one-way function according to claim 1, wherein the value generation unique value u is calculated by applying an encryption function E of a symmetric key to the function generation unique value s and the unique value d.

4. The method for generating a one-way function according to claim 1, wherein the one-way function value X(M) of the message M is calculated by applying the one-way function H and an encryption function E of a symmetric key to the value generation unique value u and the message M.

5. A computer system that generates one-way function values that calculates a one-way function X dependent on a unique value d for a user, comprising:

means for inputting the unique value d;

means for inputting a message M;

means for holding a function generation unique value s by a right issuer for the user;

means for creating a value generation unique value u from the function generation unique value s from the holding means and the unique value d, the value generation unique value u being provided as a series of m values where $u=(u_1, \ldots u_m)$ to a token for the user;

means for creating a one-way function value X(M) of the message M by applying a one-way function H to the value generation unique value u from the u-creating means and the message M, where the one-way function value $X(M)=H(u_1|M)|\ldots|H(u_m|M)$;

means for holding a certificate C to prove a public key y paired with the one-way function value X(M);

means for issuing a capability X from the right issuer to the user, the capability $\chi$ representing a right of the user in association with the message M; and means for verifying the user from the public key y and the capability $\chi$.

6. The computer system according to claim 5, wherein the process of calculating the value generation unique value u and the one-way function value X(M) is difficult to observe from the outside.

7. A computer system that performs processing based on a private key for a user dependent on a message M, comprising:

means for inputting the message M, the message M including at least identifiers of private key processing algorithms;

means for holding a value generation unique value u for the user;

means for creating a one-way function value X(M) of the message M by applying a one-way function H to the value generation unique value u from the holding means and the message M;

means for performing processing based on the private key and the one-way function value X(M);

means for issuing a capability $\chi$ from the right issuer to the user, the capability $\chi$ representing a right of the user in association with the message M; and means for verifying the user from a public key y and the capability $\chi$, wherein the value generation unique value u is created from a function generation unique value s being held and provided by a right issuer and a unique value d for the user, the value generation unique value u being provided as a series of m values where $u=(u_1, \ldots u_m)$ to a token for the user, and the one-way function value $X(M)=H(u_1|M)|\ldots|H(u_m|M)$; and wherein the identifiers in the message M enable the private key processing algorithms to be modified.

8. The computer system according to claim 7, wherein the calculation process in processing based on the value generation unique value u and the one-way function value X(M) is difficult to observe from the outside.

9. The computer system according to claim 7, wherein the computer system is configured as one of a small portable operation device and a smart card.

10. The computer system according to claim 7, wherein the computer system is configured as a module inside a CPU of a computer.

11. The computer system according to claim 7, wherein the means for performing processing based on the private key comprises:

means for inputting a challenge c;

means for calculating a response r from the challenge c and the one-way function value X(M); and means for outputting the response r.

12. The computer system according to claim 7, wherein the means for performing processing based on a private key comprises:

means for inputting a challenge c;

means for generating a random number k;

means for calculating a response r from the random number k, the challenge c, and the one-way function value X(M); and means for outputting the response r.

13. The computer system according to claim 7, wherein the means for performing processing based on a private key comprises:

means for generating a random number k;

means for calculating a commitment w from the random number k;

means for inputting a challenge c;

means for calculating the response r from the random number k, the challenge c, and the one-way function value X(M); and means for outputting the response r.

14. The computer system according to claim 7, wherein the means for performing processing based on a private key comprises:
- means for generating a random number k;
- means for calculating a commitment w from the random number k;
- means for outputting the commitment w;
- means for inputting a challenge c;
- means for calculating a response r from the random number k, the commitment w, the challenge c, and the one-way function value X(M); and
- means for outputting the response r.

15. The computer system according to claim 7, wherein the means for performing processing based on a private key performs multiplications and power operations of multiplicative groups on a finite field.

16. The computer system according to claim 7, wherein the means for performing processing based on a private key performs additions and scalar multiplication operations of elliptic curves on a finite field.

17. The computer system according to claim 7, wherein the means for performing processing based on a private key performs multiplicative residue operations and power residue operations modulo n, where n is a composite number that is difficult to factorize.

18. The computer system according to claim 7, wherein the message M includes use conditions and the means for inputting messages rejects message input if the use conditions included in the message M are not satisfied.

19. The computer system according to claim 7, wherein the message M includes private key processing parameters, and the means for performing processing based on a private key performs processing based on the private key processing parameters included in the message M.

20. A computer system that issues a proving instrument T in accordance with a unique value d for a user, comprising:
- means for inputting the unique value d;
- means for holding a function generation unique value s by a right issuer for the user;
- means for creating a value generation unique value u from the function generation unique value s from the holding means and the unique value d, the value generation unique value u being provided as a series of m values where $u=(u_1, \ldots u_m)$ to a token for the user;
- means for writing the value generation unique value u from the u-creating means to the proving instrument T;
- means for issuing the proving instrument T that includes a hash function X dependent on the unique value d;
- means for issuing a capability $\chi$ from the right issuer to the user, the capability $\chi$ representing a right of the user in association with the message M; and
- means for verifying the user from a public key y and the capability $\chi$, wherein the proving instrument T holds the value generation unique value u, and upon input of a message M, creates a one-way function value X(M) of the message M by applying a one-way function H to the value generation unique value u and the message M to perform processing based on the one-way function value X(M) expressed by $H(u_1|M)| \ldots |H(u_m|M)$.

21. An authentication method by which a right issuer issues rights to right recipients in association with a message M and a right verifier verifies the rights of the right recipients, the method comprising:
- creating a value generation unique value u from a function generation unique value s being held and provided by a function generation unique value memory and a unique value d for a user corresponding to the right recipients, the value generation unique value u being provided as a series of m values where $u=(u_1, \ldots u_m)$ to a token for the user;
- calculating a one-way function value X(M) of the message M by a hash value generator by applying a one-way function H to the value generation unique value u and the message M, where the one-way function value $X(M)=H(u_1|M)| \ldots H(u_m|M)$;
- issuing a certificate C to prove a public key y paired with the one-way function value X(M) to the right recipients by a certificate issuing unit;
- presenting the certificate C from the right recipients to the right verifier;
- performing processing by a private key processing unit based on the one-way function value X(M);
- verifying the certificate C by a certificate verification unit; and
- verifying the processing by a private key processing verification unit based on the one-way function value X(M) of the right recipients with a public key y proved by the certificate C.

22. The authentication method according to claim 21, wherein an identifier aid indicating an authentication type is included in the certificate C issued by the right issuer and the right verifier succeeds in verifying the certificate C only when the authentication identifier aid included in the certificate C matches the type of authentication to be performed.

23. The authentication method according to claim 21, wherein use conditions are included in the certificate C issued by the right issuer and the right verifier succeeds in verifying the certificate C only when the use conditions included in the certificate C are satisfied.

24. A computer system that issues a certificate C in accordance with a unique value d for a user and a message M, comprising:
- means for inputting the unique value d;
- means for inputting the message M;
- means for holding a function generation unique value s by a right issuer for the user;
- means for creating a value generation unique value u from the function generation unique value s from the holding means and the unique value d, the value generation unique value u being provided as a series of m values where $u=(u_1, \ldots u_m)$ to a token for the user;
- means for creating a one-way function value X(M) of the message M by applying a one-way function H to the value generation unique value u from the u-creating means and the message M, where the one-way function value $X(M)=H(u_1|M)| \ldots |H(u_m|M)$;
- means for creating a public key y paired with the one-way function value X(M);
- means for issuing a certificate C to prove the public key y;
- means for issuing a capability $\chi$ to the user, the capability $\chi$ representing a right of the user in association with the message M; and
- means for verifying the user from the public key y and the capability $\chi$.

25. A computer system that performs authentication in accordance with a message M, comprising:
- means for inputting the message M;
- means for holding a value generation unique value u for a user;
- means for creating a one-way function value X(M) of the message M by applying a one-way function H to the value generation unique value u from the holding means and the message M;

means for performing processing based on the one-way function value X(M);

means for holding a certificate C to prove a public key y paired with the one-way function value X(M);

means for verifying the certificate C;

means for issuing a capability $\chi$ to the user, the capability $\chi$ representing a right of the user in association with the message M;

means for verifying the user from the public key y and the capability $\chi$; and means for verifying processing based on a private key of the user with the public key y, wherein the value generation unique value u is created from a function generation unique value s being held and provided by a right issuer and the unique value d for the user, the value generation unique value u being provided as a series of m values where u= $(u_1, \ldots u_m)$ to a token for the user, and where the one-way function value $X(M)=H(u_1|M)| \ldots |H(u_m|M)$.

26. An authentication method by which a right issuer issues rights to right recipients in association with a message M and a right verifier verifies the rights of the right recipients, the method comprising:

creating a value generation unique value u from a function generation unique value s being held and provided by a function generation unique value memory and a unique value d for a user corresponding to the right recipients, the value generation unique value u being provided as a series of m values where u=$(u_1, \ldots u_m)$ to corresponding tokens for the right recipients;

calculating a one-way function value X(M) of the message M by a hash value generator by applying a one-way function H to the value generation unique value u from the right issuer and the message M;

issuing an access ticket t by an access ticket issuing unit determined from a private key x and the one-way function value X(M) to the right recipients, where $X(M)=H(u_1|M)| \ldots |H(u_m|M)$;

performing processing by a private key processing unit based on the one-way function value X(M);

converting the processing by a private key processing conversion unit based on the one-way function value X(M) to the processing based on the private key x by the access ticket t; and verifying the processing by a private key processing verification unit based on the one-way function value X(M) of the right recipients with a public key y paired with the private key x by the right verifier.

27. The authentication method according to claim 21, wherein an identifier aid indicating an authentication type is included in the message M.

28. A computer system that issues an access ticket in accordance with a unique value d for a user and a message M, comprising:

means for inputting the unique value d;

means for inputting the message M;

means for holding a function generation unique value s by a right issuer for the user;

means for creating a value generation unique value u from the function generation unique value s from the holding means and the unique value d, the value generation unique value u being provided as a series of m values where u=$(u_1, \ldots u_m)$ to a token for the user;

means for creating a one-way function value X(M) of the message M by applying a one-way function H to the value generation unique value u and the message M, where the one-way function value $X(M)= H(u_1|M)| \ldots |H(u_m|M)$;

means for creating the access ticket t from a private key x and the one-way function value X(M);

means for issuing the access ticket t;

means for issuing a capability $\chi$ from the right issuer to the user, the capability $\chi$ representing a right of the user in association with the message M; and means for verifying the user from a public key y and the capability $\chi$.

29. The computer system according to claim 28, wherein the access ticket t is calculated as a difference (x−X(M)) between the private key x and the one-way function value X(M).

30. The computer system according to claim 28, wherein the access ticket t is calculated as a quotient x/X(M) between the private key x and the one-way function value X(M).

31. The computer system according to claim 28, wherein the unique value d for the user is $(d_1, \ldots d_m)$, the value generation unique value u is $(u_1, \ldots, u_m)$ and the one-way function value X(M) is generated from bit concatenation $H(u_1|M)| \ldots |H(u_m|M)$ of the value of the one-way function H and has a desired bit length.

32. The computer system according to claim 31, wherein the value generation unique value $(u_1, \ldots, u_m)$ is found from $u_j=G(s_j|d)$ obtained by applying a one-way function G to the function generation unique value s=$(s_1, \ldots, s_m)$.

33. A computer system that performs authentication for a user in accordance with a message M, comprising:

means for inputting the message M;

means for holding a value generation unique value u for the user;

means for creating a one-way function value X(M) of the message M by applying a one-way function H to the value generation unique value u from the holding means and the message M;

means for performing processing based on the one-way function value X(M);

means for holding an access ticket t determined from a private key x and the one-way function value X(M);

means for converting the processing based on the one-way function value X(M) to processing based on the private key x by the access ticket t;

means for holding a public key y paired with the private key x;

means for issuing a capability $\chi$ from the right issuer to the user, the capability $\chi$ representing a right of the user in association with the message M;

means for verifying the user from the public key y and the capability $\chi$; and means for verifying the processing based on the private key x with the public key y, wherein the value generation unique value u is created from a function generation unique value s being held and provided by a right issuer and a unique value d provided for the user, the value generation unique value u being provided as a series of m values where u=$(u_1, \ldots u_m)$ to a token for the user, and where the one-way function value $X(M)=H(u_1|M)| \ldots |H(u_m|M)$.

34. The computer system according to claim 33, wherein the means for converting the processing based on the private key comprises means for updating a challenge c with the access ticket t.

35. The computer system according to claim 33, wherein the means for converting the processing based on the private key comprises means for updating a response r with the access ticket t.

36. The computer system according to claim 33, wherein the means for converting the processing based on the private key comprises means for updating a response r with the access ticket t and a challenge c.

37. The computer system according to claim 33, wherein the means for converting the processing based on the private key comprises means for updating a challenge c with a commitment w and means for updating a response r with the access ticket t and the challenge c.

38. The computer system according to claim 33, wherein the means for converting the processing based on the private key comprises means for updating a challenge c with the access ticket t and a commitment w, and means for updating a response r with the commitment w.

* * * * *